US011086898B2

(12) United States Patent
Muniswamy-Reddy et al.

(10) Patent No.: US 11,086,898 B2
(45) Date of Patent: Aug. 10, 2021

(54) TOKEN-BASED ADMISSION CONTROL FOR REPLICATED WRITES

(71) Applicant: Amazon Technologies, Inc., Reno, NV (US)

(72) Inventors: Kiran-Kumar Muniswamy-Reddy, Seattle, WA (US); Bjorn Patrick Swift, Seattle, WA (US); Miguel Mascarenhas Filipe, Seattle, WA (US); Timothy Andrew Rath, Seattle, WA (US); Stefano Stefani, Issaquah, WA (US); Yijun Lu, Kenmore, WA (US); Wei Xiao, Kirkland, WA (US); Stuart Henry Seelye Marshall, Seattle, WA (US); James R. Hamilton, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1169 days.

(21) Appl. No.: 13/800,796

(22) Filed: Mar. 13, 2013

(65) Prior Publication Data

US 2014/0279905 A1 Sep. 18, 2014

(51) Int. Cl.
*G06F 3/06* (2006.01)
*G06F 16/27* (2019.01)
(Continued)

(52) U.S. Cl.
CPC .............. *G06F 16/27* (2019.01); *G06F 3/065* (2013.01); *G06F 3/0613* (2013.01);
(Continued)

(58) Field of Classification Search
CPC .............................. G06F 3/065; G06F 3/0613
See application file for complete search history.

(56) References Cited

U.S. PATENT DOCUMENTS 7,130,917 B2 10/2006 Zhang et al.
7,228,354 B2 6/2007 Chambliss et al.
(Continued)

FOREIGN PATENT DOCUMENTS

EP 2031807 3/2009
JP 2009543485 12/2009
(Continued)

OTHER PUBLICATIONS

U.S. Appl. No. 13/799,386, filed Mar. 13, 2013, Swaminathan Sivasubramanian et al.

(Continued)

*Primary Examiner* — Adam M Queler
*Assistant Examiner* — Eric T Loonan
(74) *Attorney, Agent, or Firm* — Robert C. Kowert; Kowert, Hood, Munyon, Rankin & Goetzel, P.C.

(57) ABSTRACT

Methods and apparatus for token-based admission control for replicated writes are disclosed. Data objects are divided into partitions, and corresponding to each partition, at least a master replica and a slave replica are stored. A determination as to whether to accept a write request directed to the partition is made based at least in part on one or more of (a) available throughput capacity at the master replica, and (b) an indication, obtained using a token-based protocol, of available throughput capacity at the slave replica. If the write request is accepted, one or more data modification operations are initiated.

26 Claims, 12 Drawing Sheets

(51) Int. Cl.
*G06F 11/20* (2006.01)
*G06F 11/07* (2006.01)

(52) U.S. Cl.
CPC ........ *G06F 3/0683* (2013.01); *G06F 11/0757* (2013.01); *G06F 11/2023* (2013.01); *G06F 2201/84* (2013.01); *G06F 2209/522* (2013.01)

(56) References Cited

U.S. PATENT DOCUMENTS

| | | | |
|---|---|---|---|
| 7,328,274 | B2 | 2/2008 | Zhang et al. |
| 7,685,109 | B1 | 3/2010 | Ransil et al. |
| 7,911,958 | B2 | 3/2011 | Baden et al. |
| 8,190,593 | B1 | 5/2012 | Dean |
| 8,250,197 | B2 | 8/2012 | Gulati et al. |
| 8,483,194 | B1 | 7/2013 | Wu et al. |
| 2004/0111308 | A1 | 6/2004 | Yakov |
| 2005/0083845 | A1 | 4/2005 | Compton et al. |
| 2005/0240745 | A1 | 10/2005 | Iyer et al. |
| 2006/0167703 | A1 | 7/2006 | Yakov |
| 2006/0288184 | A1 | 12/2006 | Riska et al. |
| 2007/0076613 | A1 | 4/2007 | Malhotra et al. |
| 2007/0112723 | A1 | 5/2007 | Alvarez et al. |
| 2007/0226332 | A1 | 9/2007 | Becker-Szendy et al. |
| 2007/0297328 | A1 | 12/2007 | Semret et al. |
| 2008/0008094 | A1* | 1/2008 | Gilfix ............................ 370/235 |
| 2008/0008095 | A1 | 1/2008 | Gilfix |
| 2008/0031132 | A1 | 2/2008 | Compton et al. |
| 2008/0189700 | A1 | 8/2008 | Schmidt et al. |
| 2009/0003204 | A1* | 1/2009 | Okholm et al. ............. 370/230 |
| 2009/0254383 | A1 | 10/2009 | Semret et al. |
| 2010/0076805 | A1 | 3/2010 | Batsakis et al. |
| 2011/0010427 | A1 | 1/2011 | Jnagal et al. |
| 2011/0099147 | A1* | 4/2011 | McAlister et al. ........... 707/639 |
| 2011/0138051 | A1 | 6/2011 | Dawson et al. |
| 2011/0320631 | A1 | 12/2011 | Finkelstein |
| 2012/0054329 | A1 | 3/2012 | Gulati et al. |
| 2012/0101991 | A1 | 4/2012 | Srivas et al. |
| 2012/0131591 | A1 | 5/2012 | Moorthi et al. |
| 2012/0311576 | A1 | 12/2012 | Shu et al. |
| 2012/0330954 | A1 | 12/2012 | Sivasubramanian et al. |

FOREIGN PATENT DOCUMENTS

| | | |
|---|---|---|
| JP | 2013508882 | 3/2013 |
| WO | 2004102896 | 11/2004 |

OTHER PUBLICATIONS

U.S. Appl. No. 13/247,846, filed Sep. 28, 2011, Brian Helfrich et al.
U.S. Appl. No. 13/431,360, filed Mar. 27, 2012, David John Ward Jr.
U.S. Appl. No. 13/475,359, filed May 18, 2012, David John Ward Jr.
International Search Report and Written Opinion from PCT/US2014/022916, dated Jul. 11, 2014, Amazon Technologies Inc., pp. 1-20.
U.S. Appl. No. 13/327,616, filed Dec. 15, 2012, Wei Xiao, et al.
U.S. Appl. No. 13/327,620, filed Dec. 15, 2012, Wei Xiao, et al.
U.S. Appl. No. 14/701,464, filed Apr. 30, 2015, Tarang Gupta.
U.S. Appl. No. 14/701,462, filed Apr. 30, 2015 Jacob David Luszcz, et al.
Office Action from Japanese Patent Application No. 2016-501102, dated Sep. 27, 2016, pp. 1-7.
Extended European Search Report from PCT/US2014/022916, dated Nov. 15, Amazon Technologies, Inc., pp. 1-9.
Yubin Wu, et al, "IO QoS: A New Disk I/O Scheduler Module with QoS Guarantee for Cloud Platform", 2012 Fourth International Symposium on Information Science and Engineering, Dec. 14, 2012, pp. 441-444.
Wikipedia, "Token bucket", Retrieved from URL: https://en.wikipedia.org/w/index.php?title=Token_bucket&oldid=540867580 on Sep. 29, 2016, pp. 1-3.

* cited by examiner

US 11,086,898 B2

TOKEN-BASED ADMISSION CONTROL FOR REPLICATED WRITES

BACKGROUND

Several leading technology organizations are investing in building technologies that sell "software-as-a-service". Such services provide access to shared storage (e.g., database systems) and/or computing resources to clients or subscribers. Within multi-tier e-commerce systems, combinations of different types of resources may be allocated to subscribers and/or their applications, such as whole physical or virtual machines, CPUs, memory, network bandwidth, or I/O capacity.

Every system that provides services to clients needs to protect itself from a crushing load of service requests that could potentially overload the system. In general, for a Web service or remote procedure call (RPC) service, a system is considered to be in an "overloaded" state if it is not able to provide the expected quality of service for some portion of client requests it receives. Common solutions applied by overloaded systems include denying service to clients or throttling a certain number of incoming requests until the systems get out of an overloaded state.

Some current systems avoid an overload scenario by comparing the request rate with a fixed or varying global threshold and selectively refusing service to clients once this threshold has been crossed. However, this approach does not take into account differences in the amount of work that could be performed in response to accepting different types and/or instances of services requests for servicing. In addition, it is difficult, if not impossible, to define a single global threshold that is meaningful (much less that provides acceptable performance) in a system that receives different types of requests at varying, unpredictable rates, and for which the amount of work required to satisfy the requests is also varying and unpredictable. In scenarios in which the client request stream includes some operations that may result in data modification while other operations are read-only, the problems of workload management may be further complicated by durability requirements that dictate that any given data modification be persisted at multiple distinct storage devices.

Figure 1:
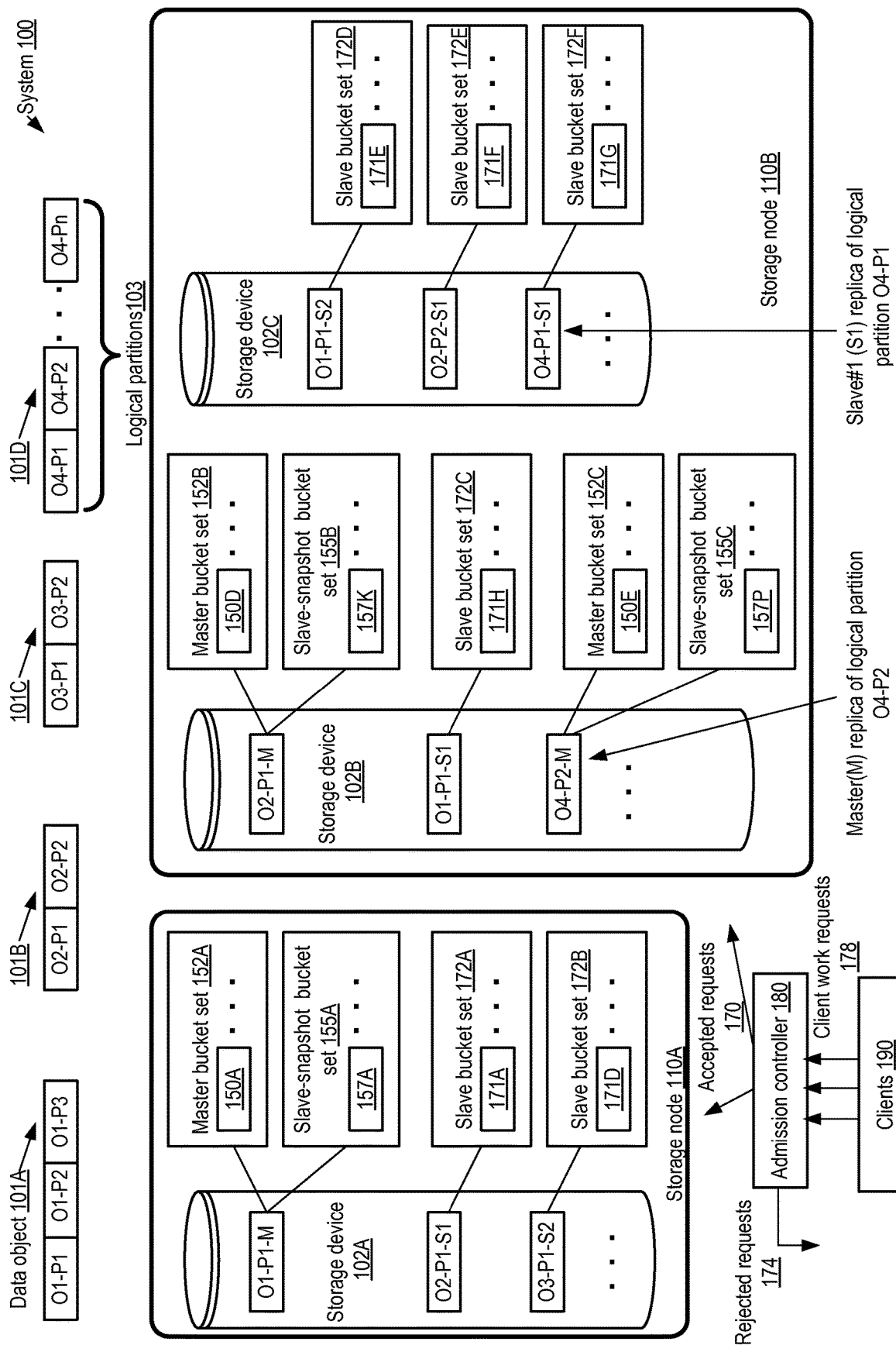
FIG. 1 illustrates an example system environment, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for implementing token-based admission control for replicated writes are described. Such a protocol may be employed, for example, in a variety of environments in which a network-accessible service (such as a multi-tenant storage or database service) supports a data durability model that involves multiple copies or replicas of a given dataset being stored, and where the different copies may be stored at devices whose I/O-related workloads may differ from each other. The term "admission control" may be used herein to represent operations performed to determine whether received work requests (such as write requests directed to a storage service) are to be accepted for implementation, and a set of software and/or hardware entities involved in performing admission control may collectively be referred to as "admission controllers". Generally speaking, in token-based admission control mechanisms used in various embodiments, at least one token bucket or container may be maintained for a given resource or replica, and the availability of some number of work tokens in at least one of those bucket(s) at the time that a decision to accept or reject a given incoming work request is made may serve as an indicator that the given resource or replica can handle the requested work. However, special consideration may be needed for admitting write operation requests, at least under some circumstances such as burst-mode operation as described below, since writes need to be replicated; therefore, information about the available throughput capacity at a single replica may be insufficient to make good admission control decisions for writes. According to some embodiments, a conservative admission control protocol described below may eliminate, or at least significantly reduce the probability of, data loss or inconsistency that may otherwise occur if a data write operation (e.g., a create, update, or delete operation) is accepted for execution by a service and the accepted write then cannot be replicated at the desired number of replicas due to overload or a lack of sufficient throughput capacity at some of the replicas. The term "throughput capacity" is used herein to represent the ability of a resource (e.g., a replica of a partition) to complete work operations (e.g., read or write operations) at a given rate. Throughput capacity may be expressed, for example, in units such as logical or physical I/O operations per second. The term "available throughput capacity" may be used herein to represent an estimate or measure of how much additional throughput the resource can provide, given its current workload. For example, a given storage device may be configured to perform up to 100 I/O operations per second, and may during a given second, be supporting a workload of 60 I/O operations per second; in this example, its available throughput capacity may be (100-60), or 40 I/O operations per second. It is noted that available throughput capacity of a given resource may be dependent on any combination of a variety of different factors in different embodiments, such as the capabilities of the underlying hardware or software, and/or policies being implemented to control or limit the throughput at the resource (based on load balancing considerations, fairness considerations, business/pricing considerations, or some combination of factors other than just the native capabilities of the hardware/software). The available throughput capacity of a resource may serve as an indirect representation of the current workload at the resource in some embodiments—e.g., as the workload rises, the available throughput capacity may generally fall, and as the workload falls, the available throughput capacity may generally rise (at least up to a policy-defined limit).

As described below, in accordance with an admission control protocol, in some embodiments work tokens maintained at various replicas of a given data object may be used as indications of the currently-available I/O throughput capacity at storage devices (e.g., solid-state storage devices, or disk-based storage devices) that store the replicas and may also be shared among replicas of other data objects. The terms "work token" and "token" may be used synonymously herein. In some such embodiments, data about such tokens may be transmitted efficiently (and at least in some cases frequently) between different replicas in an attempt to ensure that the information that is used in making decisions about accepting or rejecting new write operations is as recent and accurate as is practicable, while avoiding excessive communication-related overhead. Token-based admission control may also be used to ensure that the I/O rates to a particular storage object can be supported (at least on average) up to a provisioned throughput limit agreed upon with the owner of the storage object. In at least some embodiments, the provisioned throughput limit may indicate a workload level that the provider of the storage service is obligated (e.g., contractually obligated) to support. In some such embodiments, the service may be obliged to accept I/O requests (including writes) as long as the request rate is no higher than the provisioned throughput limit. Therefore the service may typically configure the devices being used to store the replicas of the data object in such a way that as long as request rates are below the provisioned throughput limit, the probability of write replications failing due to overload is typically kept very low. However, clients may not always be able to distribute their requests uniformly, or even close to uniformly, in time, and as a result the service may have to deal with scenarios in which the request arrival rate exceeds the provisioned throughput limit, at least for some short time periods. When request rates to a particular logical partition exceed the provisioned limit, the logical partition may be termed to be in a "burst mode" of operation. During burst mode, a best-effort workload management approach may be used by the service in some embodiments, in which the service is not obligated to support the burst of requests above the provisioned limit, but nevertheless does its best to support the received requests. In at least some embodiments, the admission control mechanism for writes described below may be used primarily during burst mode, although in other embodiments, aspects of the mechanism may be employed even during periods when the incoming request load is lower than the provisioned throughput limit. It is noted that in some embodiments, different sets of token buckets and corresponding policies may be used for writes than for reads, while in other embodiments, at least some aspects of the admission control mechanism may be used in common for reads and writes.

According to one embodiment, the token-based admission control mechanisms described herein may in general be designed to achieve at least two types of goals: (a) supporting I/O operation rates up to an agreed-upon provisioned throughput limit for the storage object and (a) making best-effort attempts to ensure that write operations directed to a storage object can be successfully replicated to a desired number of replicas during burst-mode when the rate at which operation requests arrive exceeds the provisioned throughput limit. In other embodiments, the admission control mechanism may be used primarily to try to ensure success of write replications (whether in burst mode or under normal, non-burst conditions). The terms "write operation" or "write" may refer to various types of operations in which the data and/or metadata of an object such as a database table, a file, or a volume is modified, e.g., including creations (writing new or additional data), updates (changes to pre-existing data, which may involve in-place overwriting or, e.g., in some write-once environments, creation of a new version of the data), deletions, renames, and/or moves.

Networks set up by an entity such as a company or a public sector organization to provide one or more such services (such as various types of cloud-based storage, computing or database services) accessible via the Internet and/or other networks to a distributed set of clients may be termed provider networks in this document. A given provider network may include numerous data centers (which may be distributed across different geographical regions) hosting various resource pools, such as collections of physical and/or virtualized computer servers, storage servers with one or more storage devices each, networking equipment and the like, needed to implement, configure and distribute the infrastructure and services offered by the provider. A number of different hardware and/or software components, some of which may be instantiated or executed at different data centers or in different geographical regions, may collectively be used to implement the write admission control protocol in various embodiments. It is noted that although, for the purposes of illustration, techniques for the admission control protocol are described below largely in the context of storage or database services, similar approaches may be used in other contexts as well in at least some embodiments, e.g., in a distributed content-management application in which content may be pushed to a variety of endpoints, or in a distributed software development/deployment scenario. It is also noted that terms "I/O request" and "operation request" (and the corresponding terms "read request", "write request", "read operation request", and "write operation request"), as used herein, need not necessarily correspond to a request for a single logical or physical I/O operation. Instead, in different embodiments, these terms as used herein may each represent a requested "unit of work" that may result in some number of logical and/or physical I/O operations, with the number and nature of logical and/or physical I/O operations varying, for example, based on the nature of the application or on workload conditions.

According to one embodiment, contents of a data object (such as a database table, a file or a storage volume) may be distributed among one or more logical partitions by the service. For example, a client of a database service may specify that a table is to hold approximately X terabytes (TB) of data and is expected to support a workload of Y I/O operations per second, and the database service may decide to set up a table with P logical partitions, with sufficient resources initially being designated for each of the logical partitions to store X/P TB and support a provisioned throughput capacity limit of Y/P I/O operations each. (Non-uniform distributions of provisioned throughput capacity across partitions may be used in some embodiments—e.g., if some partitions are known or expected to be "hotter", or have higher average request rates, than others.) Admission control decisions may be made at the logical partition level in at least some embodiments. Corresponding to each logical partition, a master replica and one or more slave replicas of the partition's data may be set up in accordance with a data durability policy or data replication policy for the data object. The durability/replication policy may be designed to ensure that data writes are replicated to a sufficient number of distinct physical locations that the probability of data loss due to factors such as equipment failures, power loss, and/or natural disasters is kept below a threshold. In some embodiments, admission control decisions for write requests may be made at the master replica, while admission control decisions for reads may be made at either the master replica or (especially if the client is willing to accept reads from a potentially slightly out-of-date version of the data) at a slave replica. In accordance with the replication policy, when a write request from a client is accepted, the modified data may have to be successfully replicated at N replicas (the master replica and N−1 slave replicas) in some embodiments, e.g., before an acknowledgment that the write has succeeded is provided to the client. In one embodiment, the number of slave replicas that are set up may exceed the minimum number required for the replication policy. The replication policy may require that a quorum of Q copies of a write are to be made persistent before the write is deemed successful, so that a minimum of (Q−1) slave replicas may be needed. However, for various reasons such as read load balancing, high availability and the like, the number of slave replicas maintained may exceed Q−1 in such embodiments. In the subsequent description, the terms "master" and "slave" may be used herein to represent the phrases "master replica" and "slave replica" respectively. It is noted that the designation of a particular replica as a slave or a master may change over time in various embodiments; for example, if a device at which a master for a given logical partition is instantiated fails or becomes unreachable, a different replica that was earlier designated a slave may be selected as the master. In some embodiments, the number of slave replicas may be changed over the lifetime of a data object, e.g., in response to a request from the client that owns the data object. The techniques described herein for admission control may be applied in peer-to-peer environments as well in some embodiments, where replicas are not necessarily designated as masters or slaves; in such an embodiment, the replica at which an admission control decision for an incoming write request is made may correspond (in terms of the types of operations performed) to the master replica as described herein. Thus, in some embodiments employing peer-to-peer replication in which replicas are for the most part equivalent to each other in responsibilities, if a write request is received at a given peer P1, information about the available throughput capacity of at least one other peer P2 may be used to decide whether the write request is to be accepted for execution.

In some embodiments, a method for implementing conservative write admission control may include storing, corresponding to the master, a master bucket set and a slave-snapshot bucket set. The master bucket set and the slave-snapshot bucket set may each include one or more buckets or containers for tokens that are used to limit the throughput of I/O operations to the partition, e.g., by determining whether sufficient tokens are present before accepting a new request for execution, consuming tokens when a new operation is accepted for execution, and delaying, retrying or rejecting new operations when the token population falls below a threshold. (The terms "token population" and "token count" may be used synonymously herein.) The specific combination of buckets whose population is examined before accepting a write request may differ in various implementations, and/or may differ depending on whether the corresponding logical partition is in burst mode or not. For example, in one embodiment, regardless of the population of any other bucket, a write may be admitted if at least one token is available in a particular bucket of the master bucket set (called a provisioned capacity bucket), and the presence of tokens in such a bucket may serve as an indication that the logical partition is in a normal (non-bursting) mode of operation. If the provisioned capacity bucket does not contain any tokens at the time the write request is received in such an embodiments, the token counts in one or more other buckets of the master bucket and at least one bucket in the slave-snapshot bucket set may be taken into consideration to decide whether to accept the write request, as described below in further detail.

In some embodiments, tokens of a given bucket may be used to admit or limit both reads and writes, while in other embodiments tokens may only be used for reads or only be used for writes. Each bucket may have a respective set of configuration properties in some such embodiments, such as a respective initial token population, a token consumption policy, a token refill policy, a population maximum, a population minimum (which may be negative in some cases, as discussed below), and/or a token deficit policy. Further details regarding example bucket configuration parameters in various embodiments are provided below in conjunction with the description of FIG. 3. The master bucket set may in general comprise buckets that are associated with the master's own workload and available capacity, while the slave-snapshot bucket set may comprise one or more buckets that reflect the master's view of the workload and/or available capacity at slaves. Thus, using the combination of the master bucket set and the slave-snapshot bucket set, a unified view of the available throughput capacity of the master and some number of slaves may be obtained, and such a view may be used (e.g., during burst mode, or during both normal mode and burst mode) to determine whether it is advisable to accept a new write request for execution, or whether to reject the write request. In at least some embodiments, read requests may be satisfied from any one of the replicas, and consequently, only local workload/capacity conditions at a given replica may be considered when deciding whether to accept new read operations or not. Thus, for example, the admission decision for a read directed at the master may be made using the contents of the master bucket set alone in such an embodiment, and the admission decision for a read directed at a particular slave may be made based on workload capacity conditions at that slave alone.

A slave bucket update protocol may be used to refresh the information about slave state(s) in the slave-snapshot bucket set (e.g., the slave-snapshot bucket set may be updated by modifying the number of tokens in one or more of its buckets at the master, based on information received from a slave at the master) in at least some embodiments. In some embodiments, token buckets may also be used at slaves for throughput management, in a manner similar (but not identical) to the manner in which buckets are used at the master. In accordance with a slave bucket update protocol, in one such embodiment, a slave may provide population snapshots (e.g., representations of the population of the local token buckets as of a given point in time) of one or more of the slave's local token buckets to the master. For example, one particular slave-side token bucket may represent available capacity at a shared storage device at which at least a portion of the slave's data is stored. Such a shared storage device may be used for storing data (either master replicas, slave replicas, or both) of several logical partitions, and as a result the workload experienced at the shared storage device may be dependent on the usage profiles for several different data objects, and may not be easy to predict. The shared storage device SD1 used for one slave S1 of a given logical partition L may have a very different workload than the shared storage device SDj used for a different slave Sj, for example, because the other replicas on the shared devices SD1 and SDj may belong to different combinations of logical partitions and may therefore have very different usage patterns. Examples of such variation in replica combinations on different shared storage devices used by slaves of a given logical partition are described in conjunction with the discussion of FIG. 1 below for some embodiments. The terms "snapshot of X" or "X snapshot" may be used herein instead of the phrase "a representation of X as of a given point in time". Thus, for example, the term "bucket population snapshot" for a given token bucket B may indicate a representation of the bucket population of B as of a given point in time.

In response to receiving a write request directed to a given logical partition, in some embodiments the method for conservative write admission control may comprise determining whether the write request is to be accepted for execution based at least in part on whether a sufficient number of tokens is available in one or more of (a) the master bucket set and (b) the slave-snapshot bucket set, in accordance with respective token consumption policies of the buckets of the master bucket set and the slave-snapshot bucket set. In one embodiment, during normal (non-burst) modes of operation, only the master bucket set (e.g., in particular, a provisioned capacity bucket within the master bucket set as noted above) may be used to decide whether to accept a write request, although tokens may be consumed from both bucket sets if the write request is accepted, as described below in further detail. In contrast, during burst mode, tokens may be required in both bucket sets for accepting a write, and may also be consumed from both bucket sets if the write is accepted. As also described below, whether the partition is in burst mode or in normal mode may itself be determined using the token populations of a particular bucket of the master bucket set in at least some embodiments.

In some embodiments, tokens may be required from both bucket sets even during normal mode (e.g., when the request rate directed to the partition is no higher than the provisioned throughput capacity limit of the partition). Consider, for example, one simple example implementation with one slave S1 and the master M, where writes have to be persisted at both M and S1 in order to be deemed successful. In such an implementation, the master bucket set MBS may comprise one bucket MB1 containing tokens representing available I/O throughput capacity at a storage device used by M, and the slave-snapshot bucket set SSBS may comprise a single bucket SB1 reflecting the most recently-received snapshot about the available throughput capacity at S1's shared storage device. Continuing the simple example, the consumption policies applicable to the MBS and the SSBS may require one token to be consumed from each of the buckets MB1 and SB1 for a write request to be accepted. Accordingly, the token populations of both buckets may be examined. If, in such an example, there is at least one token in MB1 and at least one token in SB1 at the time the write request is received, the request may be accepted (with the underlying assumption being that the presence of the token in each bucket indicates that sufficient capacity is available currently at both the master and the slave to allow the write to proceed). If there is less than one token in either MB1 or SB1, the request may be rejected and the client may be notified regarding the rejection (or the write may be delayed and retried). If the request is accepted, one or more data modification operations may be initiated (e.g., one write at M and a replication of the write at S1), and the token counts decremented in both buckets MB1 and SB1 at the master (tokens may also be decremented at the slave's local buckets in at least some implementations when the write is replicated at the slave). In at least some embodiments in which tokens are consumed from multiple buckets to accept a particular I/O request for execution, an atomic operation (such as a transaction, or a software routine protected by a lock) may be used to consume the tokens from all the buckets involved. After the write has been replicated at S1, the client may be notified that the modification has succeeded in some embodiments.

Thus, at least in some embodiments, the master may rely on information obtained from one or more slaves to help make admission control decisions regarding writes. The quality of the admission control decisions may in general be dependent on the accuracy of both the master-side data and the slave-side data used for the decisions. At least in some embodiments, admission control, at least for writes, may typically be performed at the master, and as a result the master-side data (such as the token populations of various buckets of the master bucket set) available for admission control may generally be very accurate. In contrast, depending on how frequently slaves provide updates to the master on the state of their shared storage devices, the information about the slaves that is used for admission control (which may be termed slave-side data) could potentially become stale and/or inaccurate. Accordingly, in at least some embodiments, the slave bucket update protocol may be designed to provide frequent updates about slave workload capacity to the master, while at the same time avoiding excessive overhead for the transfer of the slave-side information. In one implementation, for example, when the master sends a write replication request to a slave (e.g., to comply with the replication requirement for writes), the slave may send a write acknowledgment response that includes a "piggybacked" point-in-time representation of the slave's current available capacity (e.g., the current population of the slave's local shared-device token bucket may be included in the write acknowledgment). In another implementation, in which slaves are configured to send periodic heartbeat or "I-am-alive" messages to at least the master, a point-in-time snapshot of the current available capacity at the slave's shared storage device may be included in the heartbeat message. In some implementations, instead of sending piggybacked population information with every write acknowledgment and/or every heartbeat message, only some subset of write acknowledgments and/or heartbeats may be used for the population information transfer. Slave state snapshots may be included in any combination of write acknowledgments, heartbeat messages, and/or other communications between the slaves and the master in various implementations. The master may use the slave snapshots to change the population of the buckets in the slave-snapshot bucket set, e.g., by applying some mathematical function to the information contained in the snapshot and setting the population of the slave-snapshot buckets to the result of the mathematical function. Any of various mathematical functions may be used in different implementations—e.g., in one simple implementation as described below, the population of a common proxy bucket in the slave-snapshot bucket set may be set to the minimum of the latest available populations of all the slaves' shared-device buckets. In another implementation a time-varying function may be applied to the slave population information to determine the updated population of slave-snapshot buckets (e.g., the population of a slave-snapshot may be changed over time depending on how long ago the latest slave population snapshot was received at the master). In some embodiments, if a master does not receive information regarding available throughput capacity from a given slave for some specified time period, the given slave may be assumed to be inoperable or inaccessible and the slave-snapshot bucket set populations may be adjusted accordingly (e.g., until a replacement slave is found).

Piggybacking slave capacity information on communications that are already required for other purposes, such as heartbeat messages and/or write acknowledgments, may help minimize the overhead associated with the conservative write admission control protocol in various embodiments. Using write acknowledgments for this purpose may have the additional advantage in at least some embodiments that, as the write-related (as opposed to read-related) portion of the workload of the logical partition grows, the rate at which writes are propagated to slaves would tend to grow as well, and thus the rate at which slave-side capacity information is sent back to the master may also increase. This would in turn increase the freshness or recency (and hence, presumably, the accuracy) of the master's view of the available slave throughput capacity, during time periods when the importance of making better admission control decisions for the increasing write load also increases.

Example System Environment

FIG. 1 illustrates an example system environment, according to at least some embodiments. As shown, system 100 may be used to store numerous data objects 101 (e.g., tables of non-relational or relational databases, files, or volumes), such as objects 101A, 101B, 101C, and 101D. At least some of the objects may comprise logical partitions 103, such as logical partitions O4-P1, O4-P2, . . . , O4-Pn of object 101D, logical partitions O1-P1, O1-P2, and O1-P3 of data object 101A, logical partitions O2-P1 and O2-P2 of object 101B, and logical partitions O3-P1 and O3-P2 of data object 101C. The notation "Ox-Py" is used in FIG. 1 to represent the $y^{th}$ logical partition of the a data object referred to as Ox.

Corresponding to a given logical partition Ox-Py, at least one master physical replica (denoted in FIG. 1 using the notation "Ox-Py-M") of the data of the logical partition, and at one or more slave physical replicas (denoted using the notation "O-Py-Sk" for the kth slave) may be maintained in the depicted embodiment. Each replica is shown as being stored at a respective storage device 102 (e.g., devices 102A, 102B and 102C. Master replica O1-P1-M (for logical partition O1-P1) and slaves O2-P1-S1 (for logical partition O2-P1) and O3-P1-S2 (for logical partition O3-P1) are shown residing on storage device 102A. Storage devices 102 may comprise, for example, solid-state memory devices, disk drives arranged in various types of RAID (redundant arrays of independent disks) arrangements, individual disk drives, network-attached storage (NAS) devices, storage area network (SAN) devices, or any other appropriate devices for persisting data. System 100 may comprise a plurality of storage nodes 110, such as nodes 110A and 110B, in the depicted embodiment, and each storage node 110 may have one or more storage devices 102 attached to it, or accessible from it, at any given point in time.

A given storage device 102 may be shared among master and/or slave replicas of various data objects 101 and logical partitions 103 in the depicted embodiment. For example, storage device 102A comprises one master (O1-P1-M) and two slaves (O2-P1-S1 and O3-P1-S2) each storing portions of replicas of different (object, partition) combinations. At a given point in time, some storage devices (such as device 102B with masters O2-P1-M and O4-P2-M and slave O1-P1-S1) may contain multiple masters, other storage devices such as device 102C may store only slaves, while others such as device 102A may store one master and multiple slaves. It is noted that, to reduce clutter, not all the replicas of all the partitions of objects 101A-101D are illustrated at their respective storage devices 102 in FIG. 1. In many large-scale implementations, dozens or hundreds of replicas of dozens or hundreds of logical partitions may be stored at some large storage devices. In general, there may be substantial flexibility in the mappings between replicas and storage devices, mappings between replica types (master/slave) and storage devices, and mappings between storage devices and storage nodes in at least some embodiments. Furthermore, for a number of reasons, some replicas of a given logical partition may be stored in a different geographical location (e.g., a different data center) than other replicas of the same logical partition in some embodiments. In at least some embodiments the decisions as to exactly where a given replica of a logical partition is to be stored (e.g., which storage device at which storage node is to be used) may be made based on dynamically changing factors such as available space at various devices and nodes, expected or measured workload levels at various devices and nodes, client preferences, location affinity or temporal affinity with other partitions or replicas, random placement heuristics, device failure metrics, network traffic conditions, and the like.

In the embodiment depicted in FIG. 1, at least one set of token buckets is maintained for each replica, e.g., to help with admission control for operations associated with that replica. For a master, such as O1-P1-M, at least two token bucket sets may be implemented, e.g., one master bucket set 152 (e.g., 152A, 152B or 152C) and one slave-snapshot bucket set 155 (e.g., 155A, 155B, or 155C). For slaves, a corresponding slave bucket set 172 (e.g., 172A, 172B, 172C, 172D, 172E or 172F) may be maintained in at least some embodiments, although in some embodiments slave bucket sets 172 may not be employed or instantiated for write admission control purposes associated with the corresponding partition. A master bucket set 152 may comprise one or more token buckets 150 (e.g., 150A, 150D, 150E) representing workload/capacity conditions and/or constraints at the master itself—e.g., the rate of provisioned I/O operations on average that the master is expected to sustain under normal operating conditions, the rate of I/O operations that can be sustained during short-duration workload bursts, and the like, and/or the I/O capacity available at shared storage devices 102 at which the master's data is stored. A slave-snapshot bucket set 155 at a given master may comprise one or more token buckets 157 (e.g., 157A, 157K and 157P) that represent the information available at the master regarding the workload conditions at one or more slaves of that master. In some embodiments in which slave bucket sets 172 are used, each such slave bucket set may include corresponding buckets 171 (e.g., 171A, 171D, 171E, 171F, 171G, or 171H) representing local workload/capacity conditions and/or constraints at the slave.

In some embodiments, the contents of a master's slave-snapshot bucket set 155 may be updated by the master based on information obtained from the slaves of that master. In the scenario illustrated in FIG. 1, for example, the master O1-P1-M corresponding to logical partition O1-P1 may obtain snapshots or point-in-time representations of the population of buckets at each of the two slaves corresponding to O1-P1: bucket 171C of slave O1-P1-S1 and bucket 171D of slave O1-P1-S2. The snapshots may be transmitted, for example, in at least some write acknowledgment messages sent from the slaves O1-P1-S1 and O1-P1-S2 to the master O1-P1-M, or in at least some heartbeat messages sent from the slaves to the master, or in other communications.

An admission controller 180 may be responsible for accepting or rejecting incoming client work requests 178 (e.g., read requests or write requests) from clients 190 whose data is stored in the data objects 101 in the depicted embodiment. It is noted that although the admission controller is shown as a single distinct entity in FIG. 1, at least part of the admission control functionality may be implemented at storage nodes 110 and/or at other devices of system 100 in various embodiments. As noted earlier, admission control decisions may be made at the logical partition level in some embodiments (so that admission control decisions for O1-P1 may be made independently of admission control decisions for O1-P2, for example). Admission control decisions for write requests may be made at the master replicas of the logical partitions in the depicted embodiment—e.g., write admission control decisions for partition O1-P1 may be made by a component of admission controller 180 that resides on storage node 110A, and so on.

The admission controller 180 in the depicted embodiment may, for a write request directed at logical partition O1-P1, examine the populations of one or more buckets of the master bucket set 152A and the slave-snapshot bucket set 155A associated with O1-P1-M. In some implementations, different sets of buckets may be examined prior to accepting the write request depending on whether O1-P1 is in normal mode of operation (e.g., the requested I/O rates are less than the provisioned capacity limit for O1-P1) or in a burst mode of operation. If sufficient tokens can be obtained for consumption from at least one of those buckets, where sufficiency for a given bucket in this context may be defined by the token consumption policy associated with the bucket, the write request may be accepted; otherwise, the write request may be rejected and the client may be notified about the rejection 174. Accepted write requests 170 may result in the initiation of corresponding write operations (e.g., create, update, or delete operations) at the master O1-P1-M, and may be propagated from the master to slaves O1-P1-S1 and O1-P1-S2 in the depicted example scenario. Depending on the redundancy/durability requirements of object 101A, a response to the requesting client 190 may be provided only after the write has been successfully completed at a sufficient number of replicas in some embodiments, e.g., using the quorum requirements discussed in the context of FIG. 4 below. For example, in one embodiment, the write may have to completed at all three replicas of O1-P1 before the client is informed that the write succeeded, while in another embodiment or with different configuration settings for object 101A, the write may only have to be completed at O1-P1-M and one of the slaves (O1-P1-S1 or O1-P1-S2) before the client is notified. Regardless of the quorum requirements, writes may eventually be propagated from the master to all the slaves in at least some embodiments.

Token-Based Admission Control Overview

Figure 2:
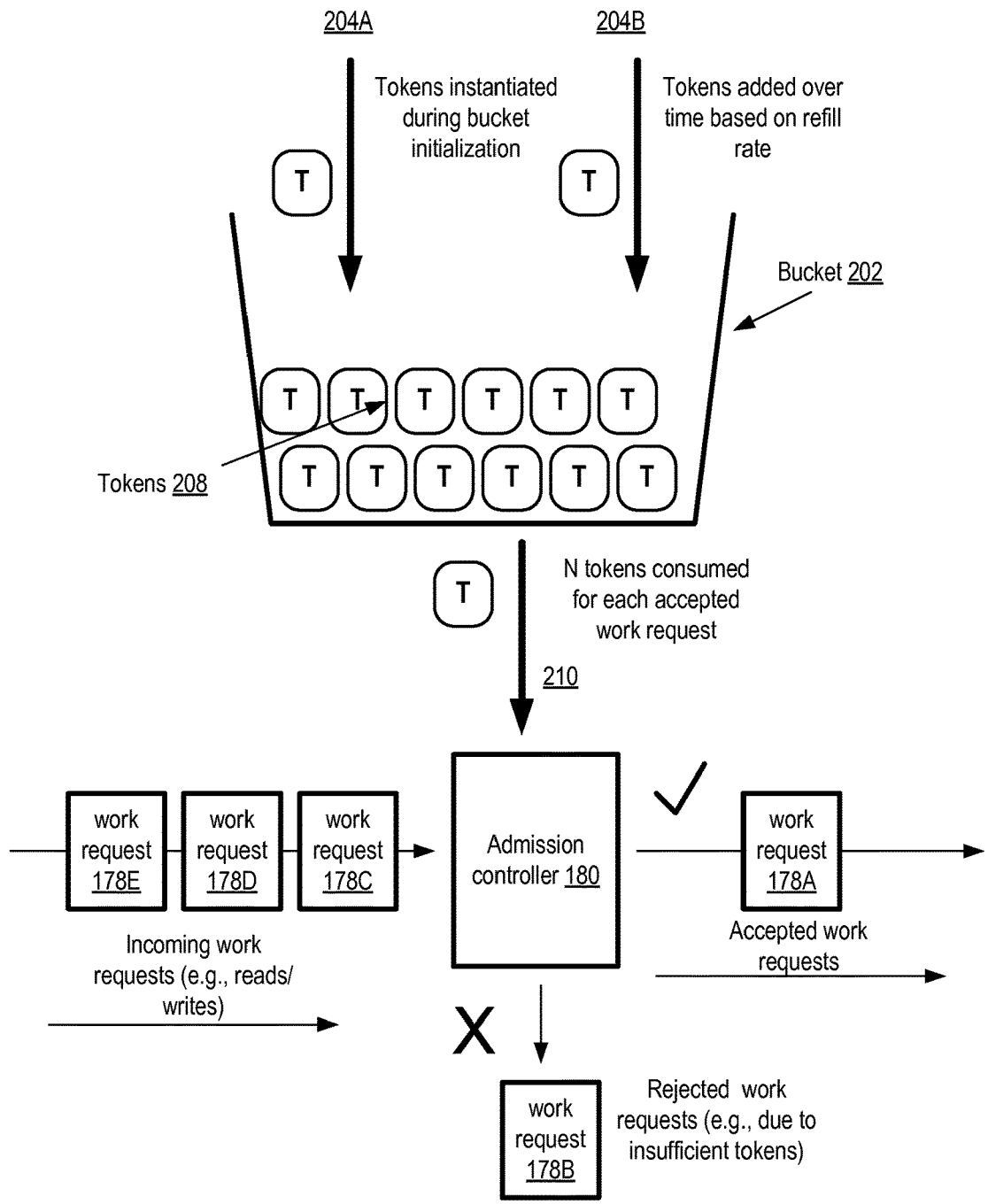
FIG. 2 provides a high-level overview of a token based admission control mechanism, according to at least some embodiments.

FIG. 2 provides a high-level overview of a token based admission control mechanism, according to at least some embodiments. A mechanism that uses a single bucket 202 of tokens is illustrated for simplicity of presentation. According to the mechanism, a bucket 202 (e.g., a logical container which may be implemented as a data structure within a software program in at least some embodiments) set up for admission control purposes associated with a particular data object, object partition, or partition replica, may be populated with an initial set of tokens 208 during bucket initialization, as indicated via arrow 204A. The initial population may be determined, e.g., based on expectations of the workload, service level agreements, a provisioning budget specified by the client that owns or manages the corresponding data object, or some combination of such factors in various embodiments. For some types of buckets the initial population may be set to zero in some embodiments. In some implementations the initial population of at least one bucket may be set to a maximum population for which the bucket is configured.

At least during normal operating conditions, when a new work request 178 (such as a read request or a write request) is received at the admission controller 180, the admission controller may attempt to determine whether some number N of tokens (where N may be greater than or equal to 1, depending on implementation or on configuration parameters) are present in the bucket 202 in the depicted embodiment. If that number of tokens is available in the bucket, the work request 178 may be accepted or admitted for execution, and the tokens may be consumed or removed from the bucket (arrow 210). Otherwise, if N tokens are nor present, the work request 178 may be rejected. In the illustrated example, work request 178A has been accepted, work request 178B has been rejected, and work requests 178C, 178D and 178E are yet to be considered by the admission controller 180.

As shown by the arrow labeled 204B, the bucket 202 may also be refilled or repopulated over time, e.g., based on configuration parameters such as a refill rate associated with the bucket, as described below with reference to FIG. 3. In some implementations, token refill operations may accompany, or be performed in close time proximity to, consumption operations—e.g., within a single software routine, N tokens may be consumed for admitting a request, and M tokens may be added based on the refill rate and the time since the bucket was last refilled. Buckets may also be populated based on unused token counts in other buckets in some scenarios, as also described below. Limits may be placed on the maximum number of tokens a bucket may hold in some embodiments, and/or on the minimum number of tokens, e.g., using configuration parameters. Using various combinations of configuration parameter settings, fairly sophisticated admission control schemes may be implemented in different embodiments, especially when multiple buckets are used together to control admissions to a given object or resource.

In one simple example scenario, to support a steady load of 100 work requests per second, bucket 202 of FIG. 2 may be configured with an initial population of 100 tokens, a maximum allowable population of 100 tokens and a minimum of zero tokens; N may be set to 1, and the refill rate may be set to 100 tokens per second, and one token may be added for refill purposes (assuming the maximum population limit is not exceeded) once every 10 milliseconds. As work requests 178 arrive, one token may be consumed for each work request. If a steady state workload at 100 work requests per second, uniformly distributed during each second, is applied, the refill rate and the workload arrival rate may balance each other. Such a steady-state workload may be sustained indefinitely in some embodiments, given the bucket parameters listed above.

If, extending the above example, the arrival rate and/or the refill rate is not uniform, scenarios may arise in which the bucket 202 remains empty for some (typically small) time intervals (e.g., if some set of work requests in rapid succession consume more tokens than the refill mechanism is able to replace). In such a case, an arriving work request may be rejected (or retried after a delay). In order to deal with non-uniformity of workloads, various techniques may be employed in different embodiments: for example, a burst-handling policy may, in one embodiment, allow banking of unused tokens in another bucket which may be termed a "burst-handling" bucket, and consuming tokens from the burst-handling bucket for short-term bursts in request rates.

Figure 3:
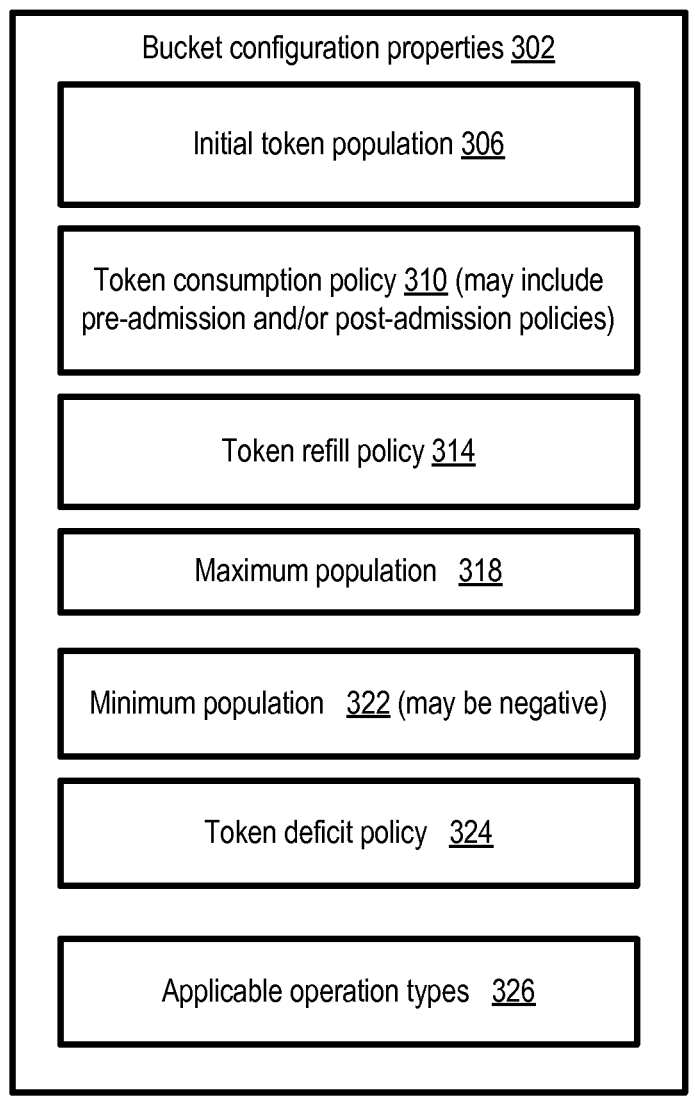
FIG. 3 illustrates example configuration properties of a token bucket used for admission control, according to at least some embodiments.

FIG. 3 illustrates example configuration properties 302 of a token bucket, such as bucket 202, which may be used for implementing various types of admission control policies, according to at least some embodiments. A token consumption policy 310 may indicate how tokens are to be consumed for admission control. In some embodiments, the consumption policy 310 may include different pre-admission policies and post-admission policies in some embodiments, and/or may be dependent on the state of other buckets or the mode of operation of the logical partition. For example, in one embodiment, two buckets may be used for admission control to a given logical partition: a provisioned capacity bucket PC and a burst-handling bucket BH. According to the pre-admission policy in effect in this example, to admit a new request, PC's population may be checked to determine whether at least one token is present, and according to the post-admission policy, if the request is admitted, PC's population may be reduced by one. If PC has a token, the logical partition may be deemed to be in normal (non-burst) mode, and BH's population may not need to be checked prior to admitting the request. However, in accordance with the post-admission policy in effect, one token from BH may nevertheless be consumed if the request is accepted. In contrast, continuing the example, if PC does not have any tokens, the logical partition may be deemed to be in burst mode, and BH's population may be checked to determine whether BH has at least one token. In burst mode, the request may be admitted only if BH has a token available, and if the request is admitted, a token may be consumed from BH. (In some implementations, in burst mode, the token population of PC may also be decremented upon a request admission, potentially making PC's population negative.) In some embodiments different numbers of tokens may be consumed for different types of operations from a given bucket based on its consumption policy. In some embodiments, a token consumption policy may also specify a decay-during-idle parameter indicating whether (and at what rate) tokens are to be deleted from the bucket if the corresponding data object is not targeted for work requests for some time, or a transfer-upon-idle parameter indicating whether tokens should be transferred from one bucket to another if they are not used during some time interval.

Properties 302 may include an initial token population parameter 306 in the depicted embodiment, which indicates how many tokens are to be placed in the bucket at startup or initialization. Token refill policy parameter 314 may indicate at what rate, and/or under what circumstances, tokens are to be added to the bucket, e.g., to help sustain a rate of work for which the data object associated with the bucket has been configured. In some embodiments, one or more of the parameters of the bucket may be changed over time—e.g., a default refill rate may apply to the bucket, but under certain conditions a non-default rate may be used. Maximum population parameter 318 may indicate the maximum capacity of the bucket, while minimum population parameter 322 may indicate the lower bound for a bucket's population. In some implementations, a bucket's population may be deemed to become negative (e.g., the minimum population may be less than zero) under some circumstances. For example, in one embodiment, the admission controller 180 may assume, for simplicity, that incoming client requests will each result in approximately one actual I/O operation. However, after an operation request R has been accepted, in some cases the actual amount of work needed as a result of admitting R may be substantially greater than the assumed one I/O: for example, a read request expected to be fulfilled by one read may end up in a scan of a table that requires 1000 reads. In such scenarios, in order to ensure that the impact of the unanticipated extra work is reflected in subsequent admission control decisions, a number of tokens corresponding to the extra work (e.g., 1000−1=999 tokens) may be deducted from the bucket, which may at least temporarily cause the token count to become negative. The token count may re-enter positive territory eventually, e.g., based on the bucket's refill rates and incoming request rates. A token deficit policy parameter 324 may specify rules about the conditions under which token deficits (or negative populations) are allowed, how long deficits are allowed to remain, what actions have to be taken to recover from a deficit, and so forth. In some embodiments, different types of operations may have different admission control rules, and the types of operations for which the bucket is to be used may be specified in applicable operation types parameter 326. In different embodiments, only a subset of the example parameters shown in FIG. 3 may be employed, while in other embodiments, additional bucket configuration parameters beyond those shown in FIG. 3 may be used. Values and/or settings for various properties shown in FIG. 3, as well as other admission control settings such as whether burst mode operation is to be supported, may be programmatically set or modified (e.g., using web service calls) in at least some embodiments. As noted earlier, in some embodiments different buckets may be used for reads and writes respectively. In embodiments in which a given bucket is being used for admission control for just one particular type of I/O operation (e.g., reads or writes, but not both), the generic term "I/O operation" when used with respect to that bucket in the description below may be deemed to refer to that particular type of I/O operation.

Figure 4:
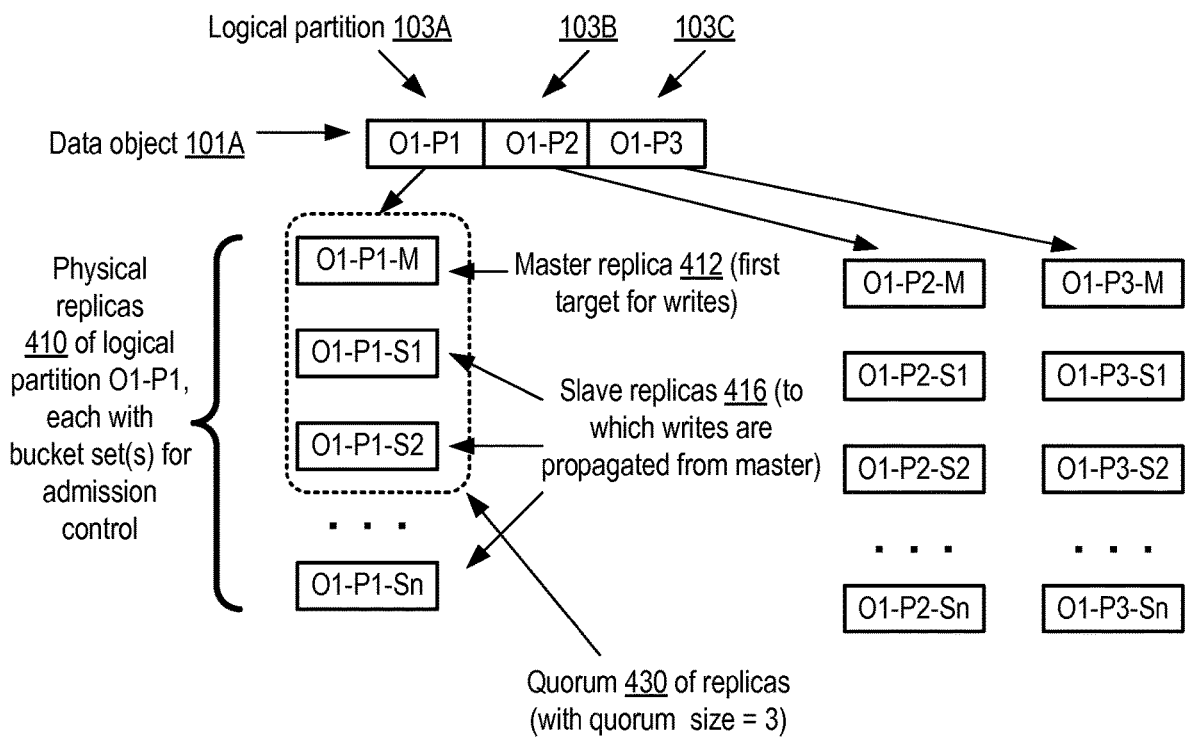
FIG. 4 illustrates an example of object partitioning and an associated quorum-based data modification policy, according to at least some embodiments.

FIG. 4 illustrates an example of object partitioning and an associated quorum-based data modification policy, according to at least some embodiments. Data object 101A, as shown, comprises three logical partitions O1-P1, O1-P2, and O1-P3. For each logical partition, (N+1) physical replicas 410 are stored: one master replica (such as O1-P1-M for partition O1-P1, O1-P2-M for partition O1-P2, and O1-P3-M for partition O1-P3) and N slave replicas. When a write operation is accepted, the corresponding data modifications are propagated to a quorum 430 comprising the master 412 and two slaves 416 before the write operation is deemed successful in the depicted embodiment. Thus, the quorum size for write replication is set to 3 in the example illustrated. Eventually, in the depicted embodiment, writes may be propagated to all N slave replicas.

In at least some implementations, respective token buckets may be maintained at each slave as well as the master, but only the bucket sets of the quorum may be used for admission control purposes for writes. As described earlier, information about the slaves' local bucket sets (e.g., the bucket sets of O1-P1-S1 and O1-P1-S2) may be conveyed to the master, the master's slave-snapshot bucket set may be updated based on the conveyed information, and the master's local bucket set together with the slave-snapshot bucket set may be used for admission control. In other embodiments, information about all the slave replicas' bucket sets may be taken into account for admission control at the master, and not just those slaves involved in the quorum.

Bucket Set Contents

Figure 5:
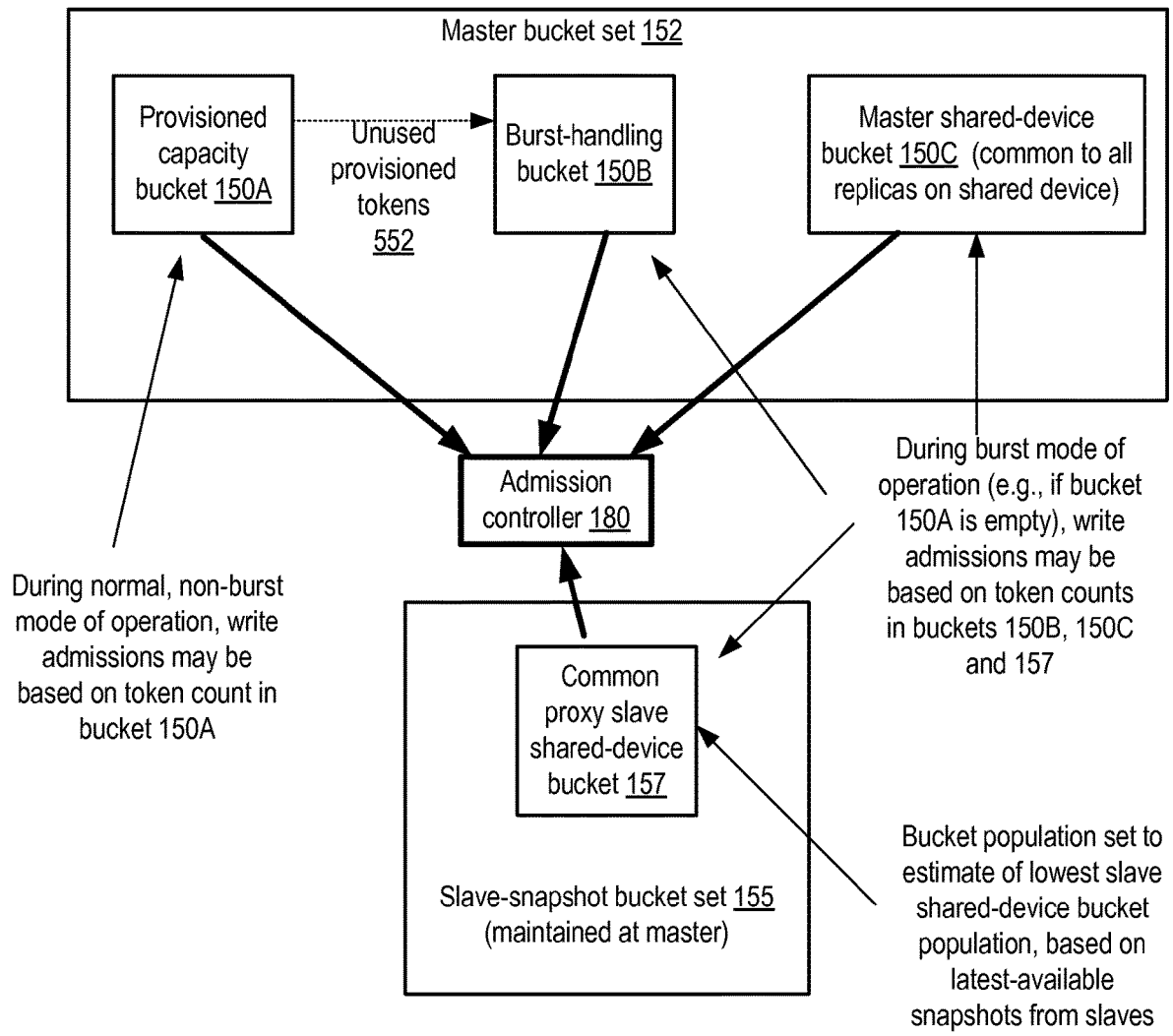
FIG. 5 illustrates an example of the types of token buckets that may be maintained at a master replica of a data object partition, according to at least some embodiments.

FIG. 5 illustrates an example of the types of token buckets that may be maintained at a master replica 412 of a data object 101's logical partition 103, according to at least some embodiments. As shown, two sets of buckets may be used in the depicted embodiment, with three buckets in the master bucket set 152, and a single bucket in slave-snapshot bucket set 155. In some implementations, the bucket sets 152 and 155 may be implemented as in-memory data structures of the admission controller 180, and may be written to persistent storage as needed. In at least some embodiments, the buckets illustrated in FIG. 5 (and in FIG. 7) may be used for write admission controls only, and different buckets may be used for reads. In embodiments in which a given bucket is being used for admission control for just one particular type of I/O operation (read or write, but not both), the generic term "I/O operation" when used with respect to that bucket in the description below may be deemed to refer to that particular type of I/O operation alone.

In the depicted embodiment, a client 190 that owns the data object 101 may have specified (and/or be contractually obligated to pay for) a particular average throughput level for the partition 103, which may be termed the provisioned throughput. Such a provisioned throughput may, for example, be specified by the client at the time that the object is created, based on targeted or expected throughput rates as estimated by the client in at least some embodiments. In one embodiment a client (and/or the storage service) may be allowed to change the provisioned throughput level after object creation. A provisioned capacity bucket 150A may be used to ensure that, at least under relatively uniform workload conditions, the service at which the data object is stored can support I/O rates at up to the provisioned throughput. Various configuration parameters of the provisioned capacity bucket may be determined at least in part on the targeted throughput specified by the client. For example, if the targeted throughput is 100 I/Os per second, provisioned capacity bucket 150A may be initially populated with 100 tokens, its maximum population may be set to 100, and its default refill rate may be set to 100 tokens/second. As long as the client requests arrive at an average of 100 requests/second and are fairly uniformly distributed in time, the targeted throughput may generally be sustained in the above example. It is noted that provisioned capacity buckets such as 150A may not be implemented in at least some embodiments.

To handle sudden bursts of I/O requests, in which (continuing the above example) for a few seconds I/O requests arrive at 200 requests per second, a burst-handling bucket 150B may be implemented in some embodiments. The burst-handling bucket may be considered a "bank" into which unused tokens from the provisioned capacity bucket 150A are stored (as indicated by arrow 552), and from which these banked tokens may be consumed to handle request bursts as needed. For example, if a client has provisioned the partition with 100 requests/second provisioned throughput, but only issues 50 requests per second for 5 seconds, 50 unused tokens per second from the provisioned capacity bucket 150A may be banked in the burst-handling bucket 150B for each of those 5 seconds. Thus, 250 tokens may be banked in the burst-handling bucket after the 5 seconds, and depending on the consumption policy of the burst-handling bucket, these banked tokens may be consumed if and when requests are received at a rate greater than the provisioned 100/second rate in the depicted embodiment. In some embodiments, instead of or in addition to banking unused tokens from buckets 150A, the population of burst-handling bucket 150B may be determined based on other factors, such as available excess I/O capacity at the storage node, the price the client is willing to pay for bursts, and so on. It is noted that burst-handling buckets need not be implemented in at least some embodiments.

A master shared-device bucket 150C may store tokens indicative of the available throughput capacity of a shared device 102 at which the master 412's data resides (examples of shared devices 102 on which replicas of multiple partitions reside are shown in FIG. 1) in the embodiment shown in FIG. 5. So, for example, if a shared solid-state drive 102A on which the master's data is stored can handle up to 1000 I/O requests per second in one embodiment, the shared-device bucket 150C may be populated with 1000 tokens, have its maximum population set at 1000 tokens, have a consumption rate of 1 per I/O request and a default token refill rate of 1000 tokens/second. The same shared-device bucket may be used for admission control by several or all the replicas resident on a given shared storage device 102 in at least some embodiments—e.g., in the example configuration shown in FIG. 1, O1-P1-M1, O2-P1-S1 and O3-P1-S2 placed on storage device 102A may use a common shared-device bucket 150C (or respective logical equivalents of the same shared-device bucket 150C). Because the workload to different replicas placed on the shared storage device 102 may differ, the admission control decisions for any one of the partitions may need to take into consideration the workloads of the other replicas on the device (at least during burst mode), and the shared-device 150C may be used to do so in the depicted embodiment. In other embodiments, or under some conditions (e.g., if a storage device is configured to store a maximum of one replica), a shared-device bucket 150 may not be implemented at the master. The number (and specific types) of buckets included in the master bucket set may differ in different embodiments. Other types of buckets than those illustrated in FIG. 5 may be employed in some embodiments.

In the depicted embodiment, the slave-snapshot bucket set 155 may comprise a common proxy slave shared-device bucket 157 (which may also be referred to herein as the "common proxy bucket"). The master replica 412 may be configured to receive indications of the workload conditions at its corresponding slaves, e.g., in the form of snapshots (point-in-time representations) of the populations of a shared-device bucket maintained at each slave as described below, which may serve as indicators of available throughput capacity at the storage devices 102 being used for the slaves. Using the latest available indications of the throughput capacity from each of one or more slaves, an estimate of the minimum of the available throughput capacities among the slaves may be determined in the depicted embodiment. (It is noted that since the available capacity indications may correspond to slightly different points in time for the different slaves in at least some implementations, and because it may take some time for the snapshots to reach the master and be processed, the estimate of the minimum may not be completely accurate, especially in high-throughput environments where available throughput capacity may change rapidly at any given storage device 102). The population of the common proxy bucket 157 may be set to reflect the estimated minimum available capacity at the one or more slaves. For example, consider an example scenario in which a master 412 has two slaves 416A and 416B, and writes have to be replicated to both slaves before being deemed successful. Each replica is placed on a different storage device 102, and each storage device may have data of multiple replicas of other partitions as well, each of which may contribute to the total I/O workload on the respective storage devices. Before accepting a write request at the master 412 during burst mode, the admission controller 180 for the master 412 may wish to determine (in addition to the master's available I/O capacity, for which master bucket set 152 can be used) whether the shared storage devices 102 being used for slaves 416A and 416B both have sufficient I/O capacity for replicating the write. Accordingly, the token population in common proxy bucket 157 may be set to represent the smaller (i.e. the minimum) available capacity at the shared devices of the two slaves 416A and 416B, based on the latest available slave information at the master. If the most recent communication from the slave 416A at the master indicated that slave 416A's shared storage device has a current available capacity equivalent to 50 tokens, and the most recent communication from slave 416B indicated that slave 416B's shared storage device has a current available capacity equivalent to 30 tokens, the population of bucket 157 would be set to 30 tokens in this example.

When a new write request is received, the admission controller for the master 412 whose bucket sets are shown in the embodiment illustrated in FIG. 5 may first be configured to determine whether bucket 150A has sufficient tokens. In one embodiment, a single token may be required to admit the write request. If bucket 150A has at least one token in such a scenario, the logical partition may be deemed to be in a normal or non-burst mode (below the provisioned limit), and the storage service may be obligated to accept the request. The write request may accordingly be accepted, and one token may be consumed from bucket 150A. In addition, in at least some embodiments, one token may be consumed from each of buckets 150B, 150C and 157. Under most circumstances, the admission control parameters may be set that, under most circumstances, if bucket 150A has tokens, buckets 150B, 150C and 157 are also highly likely to contain tokens. However, if any of these other buckets do not contain tokens under normal mode, their population may be decremented in any case, leading to a negative token population.

If bucket 150A does not have tokens (or has a negative token population) when the write request is received, the logical partition may be deemed in burst mode. The buckets 150B, 150C and 157 may each be checked to determine if they have at least one token, and the write may be accepted if all of these buckets have at least one token each. If they each contain at least one token, the write may be accepted and the token counts of each bucket 150B, 150C, 157 and 150A may be decremented. If any of the buckets 150B, 15C and 157 is empty, the write request may be rejected (or acceptance may be delayed until sufficient tokens become available). Such an admission control policy may be deemed "conservative" or "safe" in that it takes into account the most resource-constrained storage device, among all the devices used for the replicas of the partition. For example, in the example above, consider a scenario in which slave 416A's storage device has 50 tokens worth of capacity, slave 416B's storage device has 30 tokens worth of capacity, and bucket 150C has 40 tokens when a write request is received. Since bucket 157's population will be set to 30 (the minimum of 50 and 30), and one token is required from all four buckets, the available capacity of 416B's device will be taken into account in making the admission control decision during burst mode, even though the other replicas have higher available capacity. It is noted that under some (typically rare) circumstances, in one embodiment it may be the case that despite a best effort to obtain recent capacity information at the master from the slave, and to make an admission control decision based on the recent information, the slave may still not be able to complete a replication of a write operation accepted by the admission control mechanism—for example, because the workload at the slave's shared storage device increased very quickly since the last communication with the master. In such circumstances, write replication at the slave may fail, and the requesting client may in some implementations be informed that the write request did not succeed. In other embodiments instead of informing the requester that the write failed, the write replication may be delayed and/or retried some number of times, e.g., using the same slave or a different slave if one is available. In some embodiments, when a write request is received, the populations of the buckets 150A, 150B, 150C and 157 may each be checked (e.g., regardless of whether bucket 150A has a token or not) to ensure that each bucket has at least one token before admitting the write.

In other embodiments, variations on this basic approach may be employed—e.g., a given bucket may be able to borrow tokens from a different bucket if needed to allow the write under certain special circumstances in some embodiments. In general, the buckets of the master bucket set 152 may be used as indications of available I/O capacity (and/or provisioned capacity limits) at the master, while the buckets of the slave-snapshot bucket set 155 may represent the latest available information at the master about throughput capacity conditions at the slave. In different embodiments, different combinations of buckets in master bucket set may be implemented—e.g., in one embodiment, only bucket 150C may be used (with no buckets dedicated to provisioned throughput or bursts), in another embodiment, only bucket 150A and 150C may be used (with no buckets dedicated to burst handling), and so on.

Figure 6:
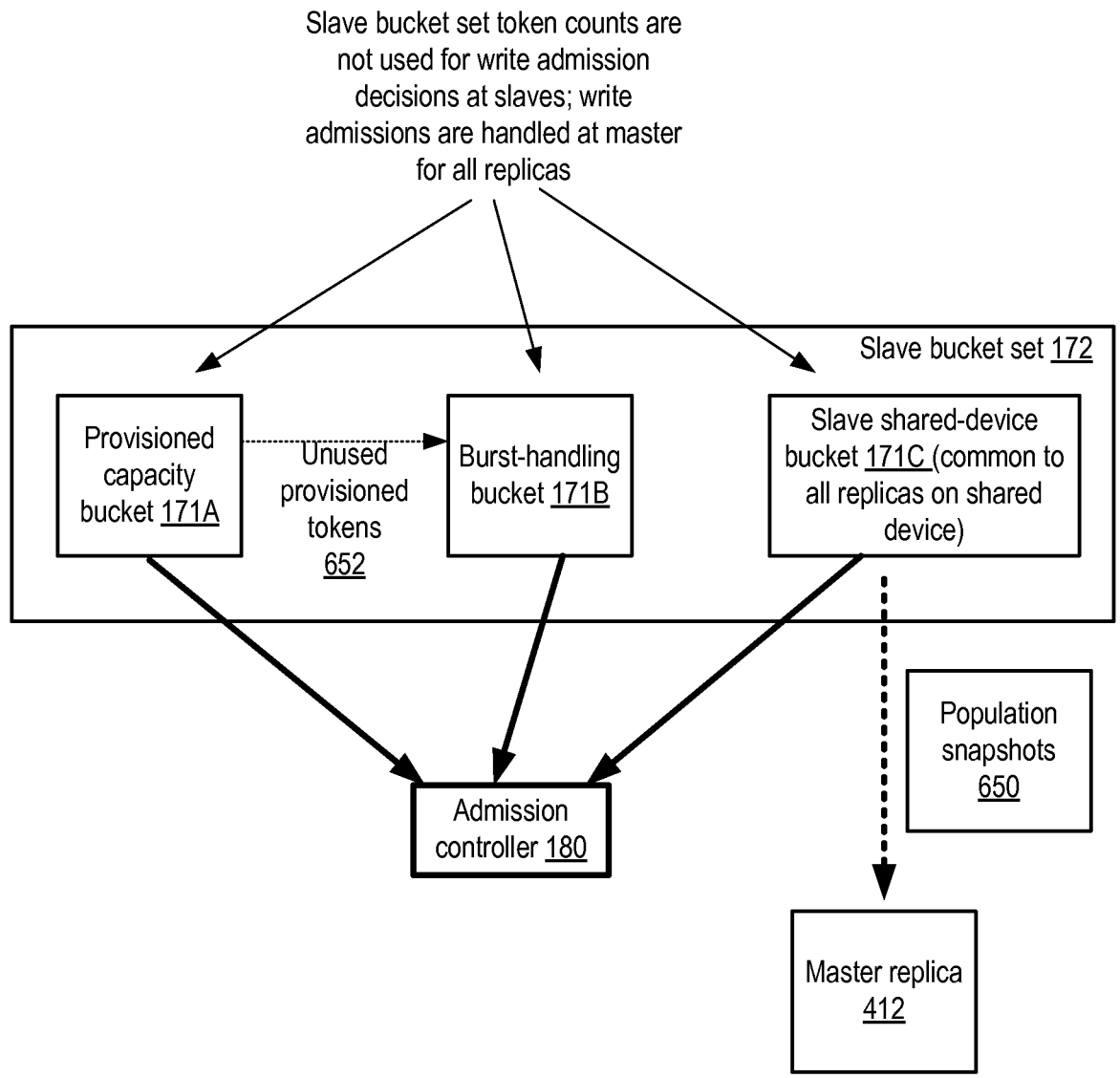
FIG. 6 illustrates an example of the types of token buckets that may be maintained at a slave replica of a data object partition, according to at least some embodiments.

FIG. 6 illustrates an example of the types of token buckets that may be maintained at a slave replica 416 of a data object 101's logical partition 103, according to at least some embodiments. As shown, in the depicted embodiment, the contents of slave bucket set 172 are similar to those of a master bucket set 152 of FIG. 5, with the major difference being that the slave bucket set's buckets represent conditions at, and are used for admission control at, the slave rather than the master. As indicated in FIG. 6, in at least some embodiments the depicted buckets 171 (even if they are set up to reflect current write activity at the slave and/or the provisioned write throughput limit at the slave) may not be used for write admission control decisions at the slave, since write admission control decisions for all the replicas of a given logical partition may be made at the master replica. The contribution of the buckets shown in FIG. 6 to write admission control decisions may be indirect, e.g., via sending population snapshots of the bucket 171C to the master as described below.

Provisioned capacity bucket 171A may hold tokens representing a (slave) provisioned throughput level agreed to by the client that owns the partition, burst-handling bucket 171B may be used to handle I/O bursts at the slave 416, and slave shared-device bucket 171C may store tokens indicative of the available capacity at the shared device at which the slave 416's data is stored. In at least some embodiments, burst-handling bucket 171B may be populated at least in part by logically transferring unused provisioned tokens from bucket 171A as indicated by arrow 652, in a manner analogous to the transfer of unused tokens from bucket 150A to bucket 150B illustrated in FIG. 5. In one embodiment, similar or identical devices 102 and/or storage nodes 110 may be used for various partitions of different data objects—e.g., the storage devices used for various replicas may have similar performance specifications, and the storage nodes 110 may each have identical compute and total storage specifications. As a consequence, the parameters for the slave-side buckets 171A, 171B and 171C shown in FIG. 6 (e.g., their initial capacities, refill rates and the like) may at least by default be set to the same values as the parameters for the corresponding master buckets 150A, 150B or 150C in some embodiments. In other embodiments, different bucket parameter settings may be used for slaves than for masters. In general, for admission control for read requests, the buckets 171 at a given slave may be used in a manner analogous to the way buckets 150 are used for read admission control at the master. A given read request may be handled at a single replica, e.g., either at a slave or at a master, in some embodiments, and thus information about available capacity at other replicas may not be required for read admission control decisions. Reads may, for example, be directed to the "least busy" replica (either a slave or a master) in embodiments in which clients are willing to have reads satisfied from a potentially slightly out-of-date slave replica. In at least some embodiments, admission control decisions for write requests directed to a logical partition 103 may be performed at the master for all the replicas, based on the information available at the master (including the information about slaves that is available at the master). It is noted that, even when the admission control decision is performed at the master for a write, tokens may be consumed at the slave as per the applicable consumption policies when the write is replicated at the slave in such embodiments.

As described earlier, information about the available I/O capacity at a shared device 102 at which a slave replica 416 is resident may be conveyed to the master, e.g., in accordance with a slave update policy, to help with conservative write admission control at the master. In the embodiment depicted in FIG. 6, messages containing population snapshots 650 of the slave shared-device bucket 171C may be sent to the master replica 412 using, for example, one of the techniques illustrated in FIG. 8a or 8b. It is noted that in some implementations, buckets need not be maintained at all for slave replicas 416; e.g., information about available capacity at a shared device used by the slave may be supplied periodically to the master 412 without necessarily implementing buckets 171 specific to the slave.

Figure 7:
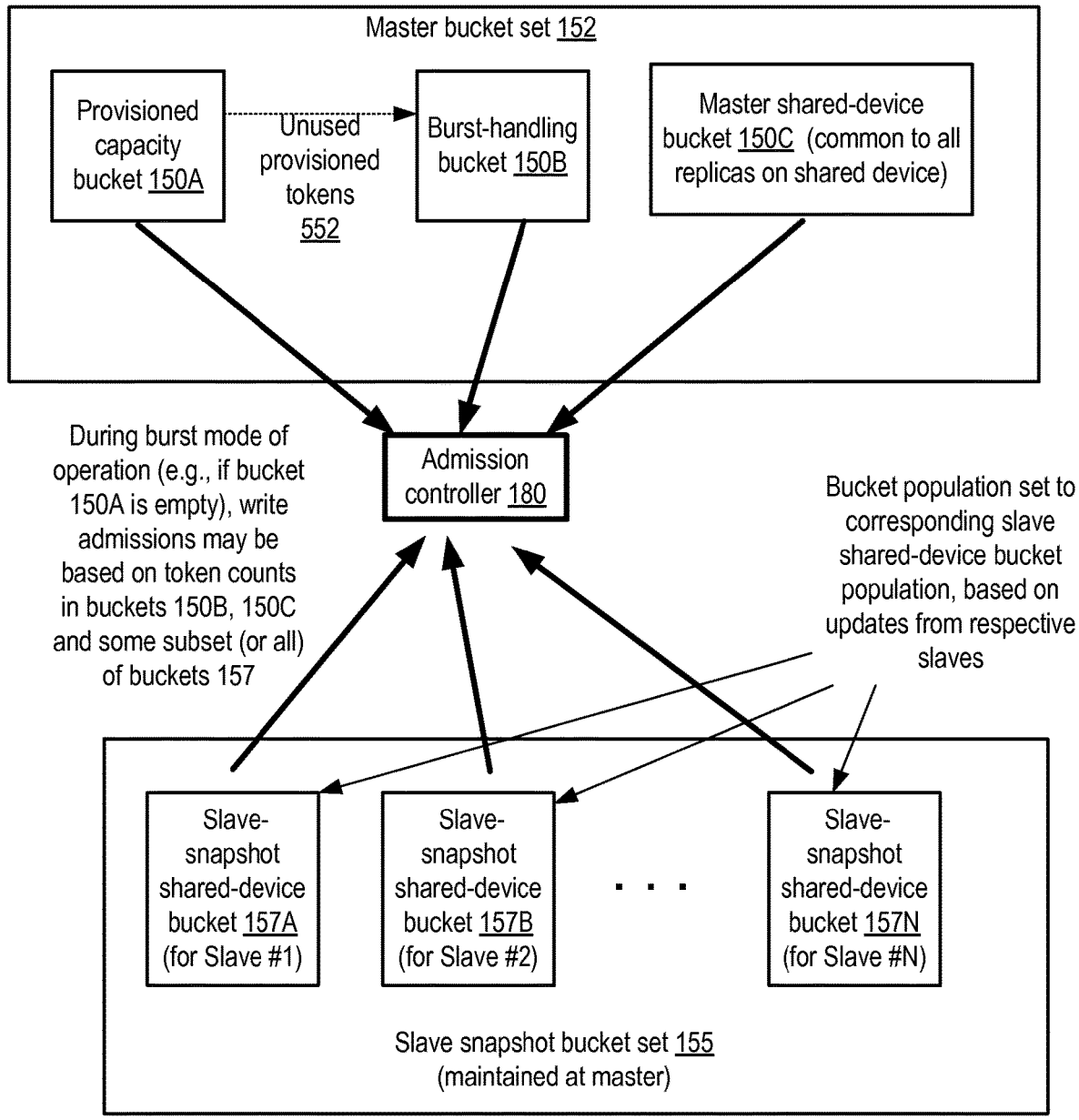
FIG. 7 illustrates another example of the types of token buckets that may be maintained at a master replica of a data object partition, according to at least some embodiments.

In the embodiment shown in FIG. 5, a common proxy bucket 157 was used for maintaining slave device information at the master. Instead of using a common proxy bucket representing all the slaves, and computing the minimum of the available slave device capacities at the master to determine the population of the common proxy bucket, other approaches may be used in some embodiments. FIG. 7 illustrates another example of the types of token buckets that may be maintained at a master replica of a data object partition, according to at least some embodiments. A total of n slaves are implemented for each master in the embodiment of FIG. 7. The master-side arrangement of buckets in FIG. 7 is identical to that shown in FIG. 5. However, the slave-snapshot bucket set in the embodiment shown in FIG. 7 comprises one bucket per slave, instead of the single common proxy bucket of FIG. 5. Slave-snapshot shared-device bucket 157A stores tokens indicating the latest-available information about the available capacity at slave #1's shared storage device, bucket 157B stores tokens indicating the latest-available information about the available capacity at slave #2's shared storage device, and so on. Slave-snapshot shared-device buckets may be referred to herein simply as "slave snapshot buckets" or "snapshot buckets". When a write request is received, bucket 150A may be checked first. If there are enough tokens in bucket 150A, as in the case of the embodiments shown in FIG. 5, the write may be admitted, as the request rate is below the provisioned limit. Even during normal mode, if the write is admitted, tokens may be consumed from each of the buckets shown in FIG. 7.

If there are not enough tokens in the provisioned capacity bucket 150A, the logical partition may be deemed to be in burst mode. During burst mode, the admission controller 180 may configured to allow the write to proceed only if one token is available in each of the master bucket set's buckets 150B and 150C, and in each of Q buckets of the slave-snapshot bucket set 155, where the number of replicas at which the write must be completed before it is deemed a success is (Q+1) (e.g., Q slaves and one master replica). Thus, the admission controller 180 may use the slave-snapshot bucket set, whose bucket populations track (as closely as the latest-available communications from the slaves allow) the bucket populations of the slaves' shared-drive buckets 171C, to ensure that at least a quorum number of replicas can be successfully written to, before admitting the write request in burst mode. In some embodiments, tokens may be consumed from each of the N buckets in slave-snapshot bucket set, regardless of the quorum size for writes. In embodiments in which tokens from only a quorum (rather than each) of the slave shared-device buckets are consumed, the writes may be replicated first to the corresponding slave replicas whose tokens are consumed (i.e., before the write is replicated to other slaves). In one embodiment, regardless of whether bucket 150A has enough tokens or not, all the buckets of master bucket set 152 of FIG. 7 may be checked to ensure that they have enough tokens to allow the write to proceed, and in addition, at least Q buckets of slave-snapshot bucket set 155 may be checked to ensure that they have enough tokens before the write is allowed to proceed.

In at least some embodiments, in addition to or instead of the types of replica-based token buckets and/or shared-device token-buckets shown in FIG. 5-FIG. 7, one or more node-level token buckets may be employed for write admission control. For example, corresponding to a storage node 110 at which at least a portion of a master replica's data is stored, a node capability bucket may be implemented in one embodiment, where the token population of the node capability bucket is based at least in part on metrics of some set of performance capabilities or limits of the storage node 110 taken as a whole. Such metrics may for example indicate the available processing capacity of the storage node (e.g., in terms of CPU cycles, utilization limits, or speed), memory limits, thread-count limits, operating system logical resource limits (e.g., number of open files or sockets), networking limits, or limits on any other types of capabilities that may be used for writes or reads. In such embodiments, at least some admission control decisions for writes may be based on the number of tokens available in the node capability bucket. A given node capability bucket may be used for admission control decisions for each of multiple replicas (e.g., for more than one master, or more than one slave, or a combination of masters and slaves) whose data is stored on a given storage node 110 in some embodiments. In at least one embodiment, a node capability bucket may be included in a master bucket set (and/or in a slave bucket set).

It is noted that various properties of admission control policies may be configurable via programmatic interfaces (e.g., web services application programming interfaces (APIs) or other APIs, web pages, command-line tools, or custom graphical user interfaces) in some embodiments. Thus, for example, decisions regarding whether burst mode write operations are to be supported at all for a given data object or partition, how many tokens are to be consumed from which set of buckets in various modes of operation, or values/settings for various other bucket properties shown in FIG. 3, may be based at least in part on configuration requests received via such programmatic interfaces from authorized entities (such as clients that own the data objects) in such embodiments.

As noted earlier, in at least some embodiments in which tokens are consumed from multiple buckets (such as buckets 150A, 150B, 150C and 157 of FIG. 5, or the buckets shown in FIG. 6 or FIG. 7) to accept a particular I/O request for execution, an atomic operation (such as a transaction, or a software routine protected by a lock) may be used for consuming the tokens from the relevant collection of buckets. In some embodiments the atomic operation may comprise examining the token populations of the buckets and refilling the buckets as well, i.e., all three types of bucket operations may be performed in a single atomic operation: the examinations of the buckets' populations, the reductions of the populations, and the refill operations. Such atomic operations may help to reduce the probability of reaching inconsistent states, where for example, after a decision to allow an I/O request is received, one of the buckets runs out of tokens (due to another I/O request) before the appropriate number of tokens is consumed from it. In some embodiments, at least some of the consumption and/or refill operations may not be performed within such combined atomic operations.

Collecting Slave-Side Information at Masters

Figure 8A:
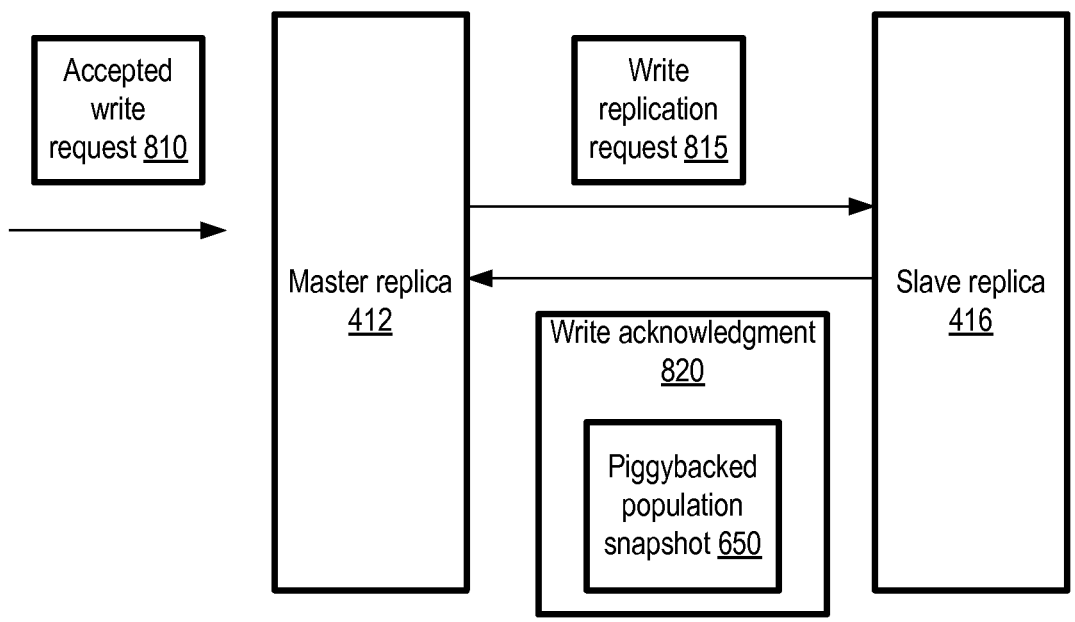
FIGS. 8a and 8b illustrate respective sets of interactions for obtaining slave throughout capacity information at a master replica, according to at least some embodiments.
Figure 8B:
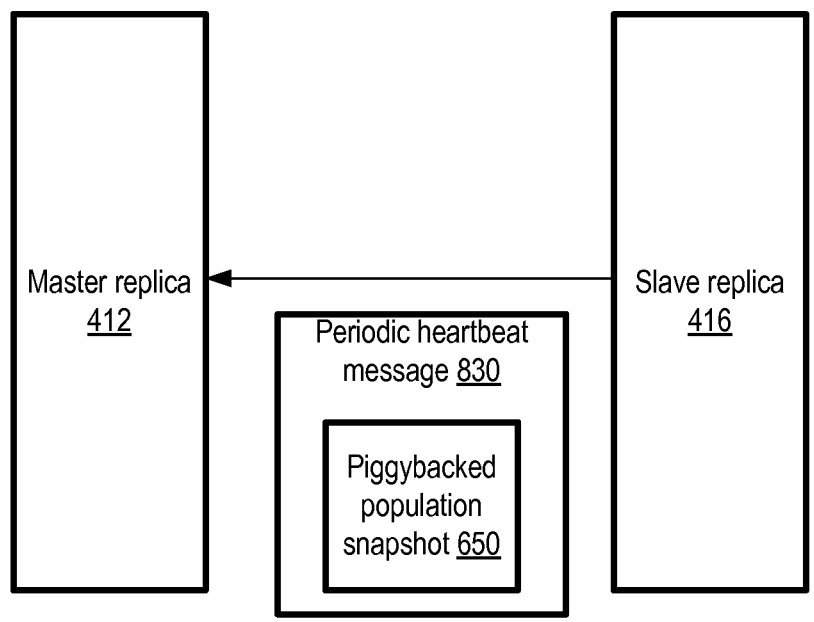

FIGS. 8a and 8b illustrate respective sets of interactions for obtaining slave throughput capacity information at a master replica, according to at least some embodiments. In the embodiment depicted in FIG. 8a, a master replica 412 sends a write replication request 815 to a slave replica 416, corresponding to an accepted write request 810, in accordance with durability policy and/or the replication policy in effect for the data object to which the write is directed. The slave replica 416 receives the write replication request, performs the appropriate write operation, and sends a write acknowledgment 820 back to the master. In addition to the result of the slave's write operation, write acknowledgment 820 also includes a piggybacked population snapshot 650 indicating the available throughput capacity (e.g., the population of a bucket 171C for a shared device on which the slave's data is resident, as of the time the write replication is attempted) at the slave's storage device 102. (The term "piggybacked", as used herein, indicates that the information about the slave's shared storage device is added onto a communication that would have occurred anyway, regardless of the specific approach to admission control being used, or even if admission control was not being used at all; thus, the communication of snapshot typically incurs very little overhead, especially as compared to the costs of sending the snapshots as independent messages). The snapshot 650 may be used at the master to update the population of the slave-snapshot bucket set, as described above. It is noted that in at least some embodiments, the snapshot may be sent regardless of whether the slave successfully replicated the write, or not; e.g., even if the write could not be replicated at the slave for some reason, an updated view of the shared device's capacity may be provided to the master. In one implementation, only a subset of the write acknowledgments may include piggybacked population snapshots— e.g., the slave replica 416 may choose to add population snapshots to randomly-selected write acknowledgments, or may choose to add the piggybacked information to at most one write acknowledgment per 100 milliseconds.

In some embodiments, instead of or in addition to using write acknowledgments 820 to refresh the master's view of the slave's throughput availability, a heartbeat mechanism may be used, as shown in FIG. 8b. In the depicted example, a slave may be configured to send a periodic heartbeat message 830 to the master (and/or to other slaves), indicative of the health state of the slave (e.g., indicating that the slave is up and network-accessible). A population snapshot 650 may be piggybacked onto a heartbeat message 830 in the depicted embodiment. In some embodiments, all heartbeat messages sent to a master 412 may include population snapshots 650, while in other embodiments some selected subset of heartbeat messages may be used for piggybacking the throughput capacity information. It is noted that in some embodiments, other mechanisms may be used to communicate the slave's device throughout capacity to the master, e.g., in one embodiment, if no write replication request is received for X minutes, and heartbeats are not used, a slave may transmit a dedicated message comprising the population snapshot alone to the master (i.e., piggybacking may not be employed). In some embodiments, a master may periodically, or as needed, send a capacity update request to a slave to obtain or update information about the slave's throughput capacity.

Methods for Token-Based Write Admission Control

Figure 9:
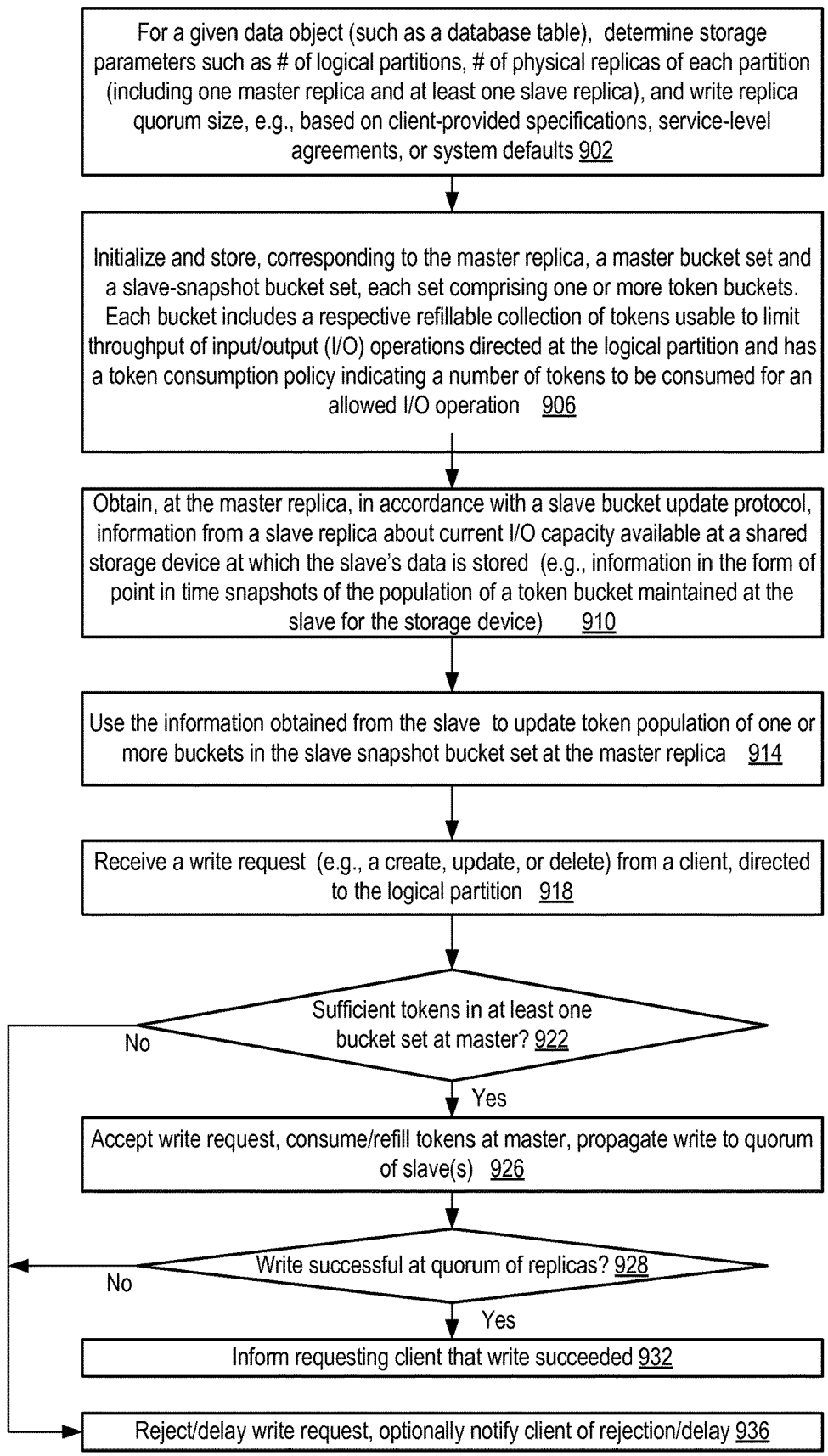
FIG. 9 is a flow diagram illustrating aspects of operations that may be performed to implement a token-based admission control mechanism for writes at a network-accessible service, according to at least some embodiments.

FIG. 9 is a flow diagram illustrating aspects of operations that may be performed to implement a token-based admission control mechanism for writes at a network-accessible service, according to at least some embodiments. As shown in element 902 of FIG. 9, storage parameters for a given data object 101 (such as a table of a relational or non-relational database, a file or file system, a volume, or any other type of data object) may be determined. Values for a number of different parameters may be determined, such as the number of logical partitions 103 into which the data object should be distributed, the number of physical replicas for each logical partition to be maintained for durability and/or availability reasons, the write replica quorum size (e.g., at how many replicas a write needs to be persisted prior to deeming the corresponding write request successful) and the like. Values of the parameters may be selected based on any combination of a variety of factors in different embodiments, such as client-provided specifications (e.g., at object creation time) or preferences, service-level agreements in place with the client on whose behalf the data object is to be maintained, system defaults, metrics obtained for other data objects expected to have similar workloads, and so on. In the depicted embodiment, at least one master replica 412 and at least one slave replica 416 may be maintained corresponding to each logical partition 103 of the data object 101.

As shown in element 906 of FIG. 9, the service may initialize and store, corresponding to a master replica 412 of a given logical partition 103, a master bucket set 152 and a slave-snapshot bucket set 157, each set comprising one or more token buckets 202. Each bucket may include a respective refillable collection of tokens usable to limit throughput of input/output (I/O) operations directed at the logical partition 103, and each bucket may have a respective token consumption policy indicating under what circumstances (and how many, if any) tokens are to be consumed from that bucket for an allowed I/O operation. The master bucket set 152 may comprise at least some information local to the master—e.g., in one implementation, the current token count of a particular bucket 150C of the master bucket set may reflect the available throughput capacity at the shared storage device on which the master's data is stored. Other buckets of the master bucket set may be used to achieve a provisioned throughput level associated with the logical partition (e.g., a rate of I/O operations that the owner of the data object has requested and/or paid for), or to handle short-term bursts in I/O workload. The slave-snapshot bucket set may comprise buckets representing the available throughput capacity at one or more slaves 416—e.g., one such bucket may indicate the master's view of the number of tokens present in a bucket associated with a shared storage device on which a slave's data is stored. In some embodiments different sets of buckets may be used for admission control for reads than are used for admission control for writes.

The master may obtain information about available throughput capacity at a slave using a particular slave bucket update protocol (element 910) in the depicted embodiment. For example, snapshots or point-in-time values of the population of a token bucket (such as bucket 171C of FIG. 6) maintained at the slave to indicate available throughput capacity of a shared storage device used by the slave may be sent to the master in write acknowledgment messages in one embodiment, and/or in heartbeat messages sent from the slave to the master. The master may use the information obtained via the protocol to update the token population in one or more buckets of the slave-snapshot bucket set in the depicted embodiment (element 914). By adding or piggy-backing the slave-side available capacity snapshots within messages that would already be sent for other reasons to the master (e.g., to acknowledge write replication requests, or to confirm that the slave is up and running), the overhead introduced by the write admission control mechanism may be minimized in at least some embodiments.

For example, consider an embodiment in which a logical partition has a master M and two slave replicas S1 and S2 whose data is stored on shared storage devices D1 and D2 respectively. Device-specific token buckets SB1 and SB2 may be maintained at the respective slaves S1 and S2, indicating currently available throughput capacities of D1 and D2 respectively. A common proxy bucket CPB may be maintained in the slave-snapshot bucket set at the master, to store the latest information available about the minimum throughput capacity among D1 and D2. S1 may provide to the master, piggybacked within a write acknowledgment at time T1, population (SB1) —i.e., the number of tokens currently in SB1. Similarly, S2 may provide to the master, in a write acknowledgment at time (T1+delta1), population (SB2). When the master received population (SB1), it may compare population (SB1) to population (CPB), the current token count of the common proxy bucket, and if population (SB1) is less than population (CPB), population (CPB) may be set to population (SB1). A similar check may be performed when population (SB2) is received at the master. Thus the master may keep tracking the minimum throughput capacity of the two slaves' device-specific buckets using the common proxy bucket, although at any given instant the master's view may be slightly out of date with respect to one or both of the slaves, depending on how frequently the slave-side information is updated. In some implementations, instead of a common proxy bucket, respective snapshot buckets may be maintained at the master corresponding to each slave, as illustrated in FIG. 7.

Figure 10:
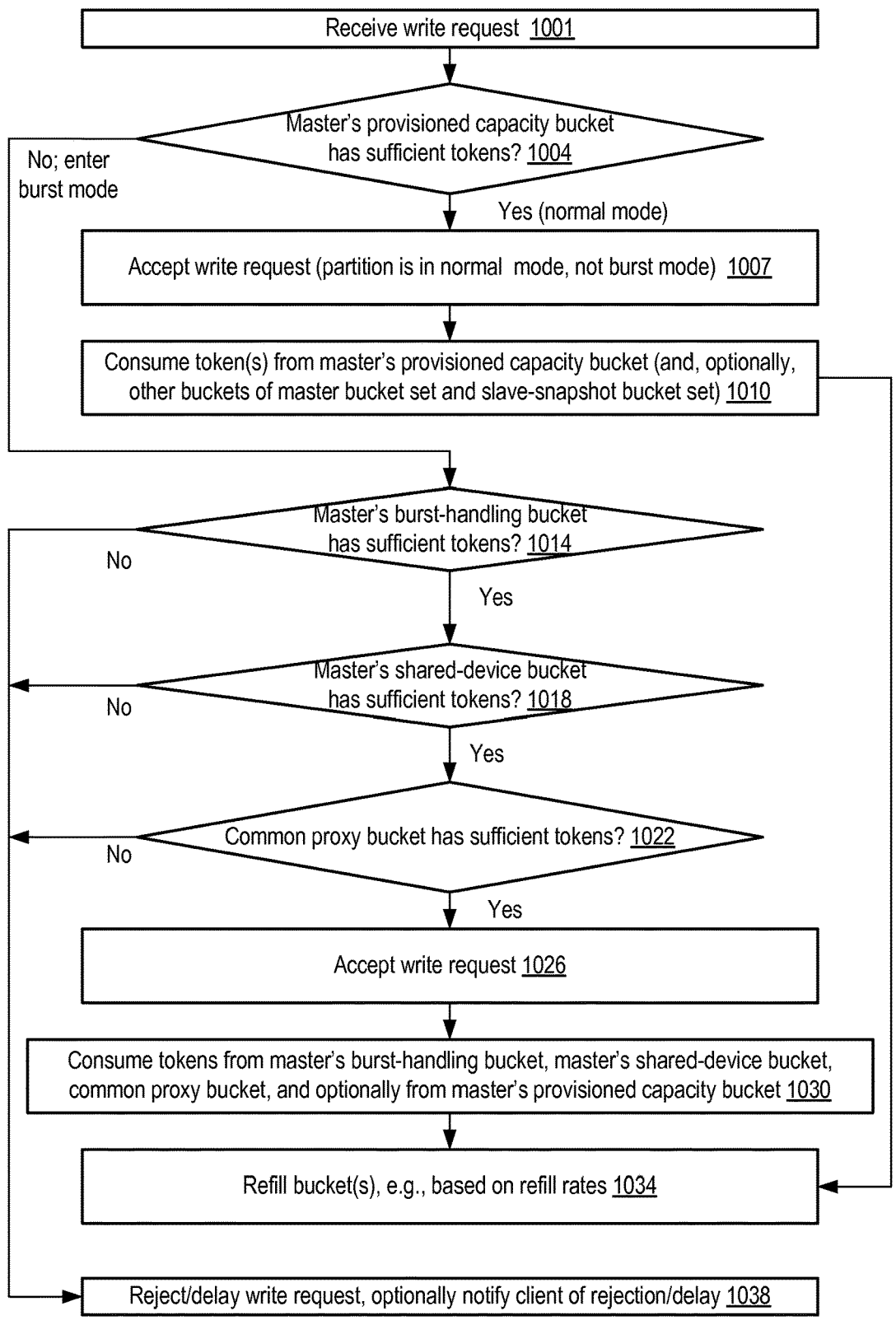
FIG. 10 is a flow diagram illustrating aspects of operations that may be performed to implement a token-based admission control mechanism for writes during a burst mode of operation, according to at least some embodiments.

As indicated in element 918, a write request directed to the logical partition (such as a create, update or delete request for some portion of the logical partition) may be received. In the depicted embodiment, admission control for writes may be handled with respect to, or at, the master replica for all the replicas of the logical partition. The admission control mechanism may determine whether sufficient tokens exist at one or both bucket sets of the master bucket set and the slave-snapshot bucket set, where sufficiency of tokens may be interpreted for each bucket in the bucket sets based on a respective consumption policy for the bucket. In one implementation, for example, if a particular bucket (e.g., a provisioned capacity bucket such as bucket 150A of the master bucket set of FIG. 5) has sufficient tokens based on its consumption policy, the request may be admitted regardless of the state of the other buckets. In such an implementation, if the particular bucket does not have enough tokens, the populations of other buckets may be examined and the request may be admitted based on the contents of those other buckets, as illustrated in FIG. 10 and described below. In another implementation, one token may be needed in each bucket of each set to allow the write request. In one implementation where multiple buckets are implemented within a given bucket set, zero tokens may be required from one or more buckets of the set, while one or more tokens may be required from each of one or more other buckets of the set. In other implementations, different numbers of tokens may be required from various buckets, depending on parameters of the write request—e.g., if the admission control mechanism is able to determine that the write request will result in a large number of physical or logical writes, more than one token may be consumed from a particular bucket.

If sufficient tokens are found in each of the bucket sets, based on the consumption policy or policies in effect, as determined in operations corresponding to element 922 of FIG. 9, the write request may be accepted for execution (element 926). The appropriate number of tokens may be consumed from each of the bucket sets, and write replication requests may be sent from the master to the appropriate number of slaves. If the writes are successfully replicated at the quorum number of replicas (as determined in element 928), the requesting client may be informed that the write succeeded (element 932). If sufficient tokens are not found (as determined in element 922) or if the write is not successful at any of the quorum replicas (as determined in element 928), the client may be informed that the write failed in some embodiments (element 936). In other embodiments, the write may be retried after a delay.

FIG. 10 is a flow diagram illustrating aspects of operations that may be performed to implement a token-based admission control mechanism for burst-mode writes at a network-accessible service, according to at least some embodiments. The master bucket set in the depicted embodiment may comprise provisioned capacity bucket 150A, burst-handling bucket 150B and master shared-device 150C similar to those of FIG. 5 The slave-snapshot bucket set may comprise a common proxy bucket 157 similar to that shown in FIG. 5. As shown in element 1001, a write request may be received at an admission controller 180 associated with the master replica of the logical partition to which the write is directed.

If the master's provisioned capacity bucket 150A has sufficient tokens based on its consumption policy (as determined in element 1004), the logical partition may be deemed to be in normal (non-burst) mode, and the write request may be accepted (element 1007). One or more tokens may be consumed (removed) from the provisioned capacity bucket to reflect the acceptance of the write (element 1010). In at least some embodiments, tokens may also be removed from other buckets of the master bucket set and/or the slave-snapshot bucket set based on the respective consumption policies of the buckets—e.g., in one simple implementation, one token may be consumed from each of buckets 150A, 150B, 150C and 157. Depending on the refill rates of the various buckets, tokens may be added to one or more buckets of the master bucket set (element 1034) in the depicted embodiment. (Changes to the population of the slave-snapshot bucket set may be based on communications received from the slave replicas, as described above; examples of operations related to such communications are illustrated in FIGS. 11a and 11b.)

If, however, the master's provisioned capacity bucket 150A does not have sufficient tokens (as also determined in element 1004), the logical partition may be deemed to be in burst mode. In the depicted embodiment, in burst mode, each of the buckets 150B, 150C and 150D may be checked to determine whether they each have sufficient tokens based on their consumption policies. As shown in element 1014, the burst-handling bucket 150B may be checked first, e.g., to determine whether the logical partition is within a configured burst peak capacity limit and/or has enough banked tokens to allow bursts. If bucket 150B has sufficient tokens, the master shared-device bucket 150C may be checked next (element 1018), e.g., to determine whether sufficient throughput capacity is available at the shared storage device used for the master's data. Then, if the master's shared-device bucket 150C has enough tokens, the slave-snapshot common proxy bucket 157 may be checked, e.g., to determine whether the slave replica(s) are likely to have enough throughput capacity at their respective shared devices (element 1022). (It is noted that in embodiments in which the slave-snapshot bucket set has one snapshot bucket for each slave, as depicted in FIG. 7, each of at least a subset of the snapshot buckets may be checked instead of checking the common proxy bucket.) If all the buckets checked in operations corresponding to elements 1014, 1018 and 1022 have enough tokens, the write request may be accepted for execution (element 1026). The appropriate number of tokens may be consumed from each bucket 150B, 150C and 157 (element 1030). In some embodiments, a token may optionally be "consumed" from the provisioned capacity bucket 150A as well (which may result in a negative population of the provisioned capacity bucket). The various buckets of the master bucket set may be refilled as per their respective refill rates (element 1034). If any of the operations illustrated in elements 1014, 1018 and 1022 indicated that the corresponding bucket did not have sufficient tokens, the write request may be rejected (or delayed/retried), and in some implementations the client may be notified regarding the rejection (element 1038). It is noted that the order in which the buckets are checked during burst mode may differ in different implementations, and that all the bucket checks, token consumption operations and/or refills for the various buckets may be performed within a single atomic operation such as a transaction in at least some embodiments.

Figure 11A:
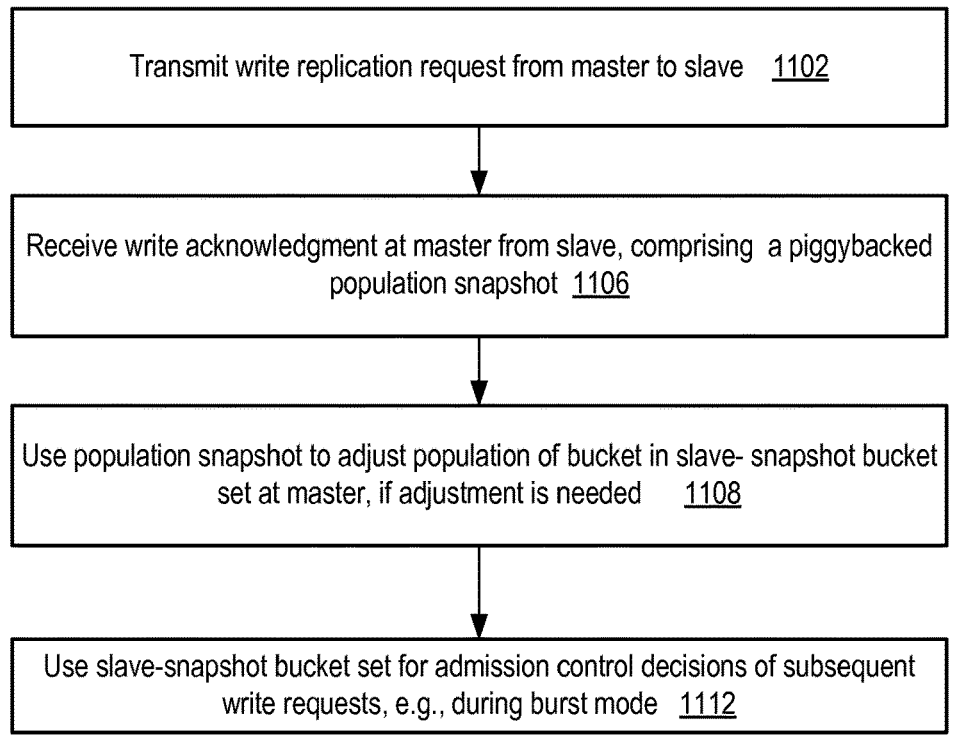
FIGS. 11a and 11b are flow diagrams illustrating aspects of operations that may be performed to obtain slave replica shared-storage bucket population at a master replica, according to at least some embodiments.
Figure 11B:
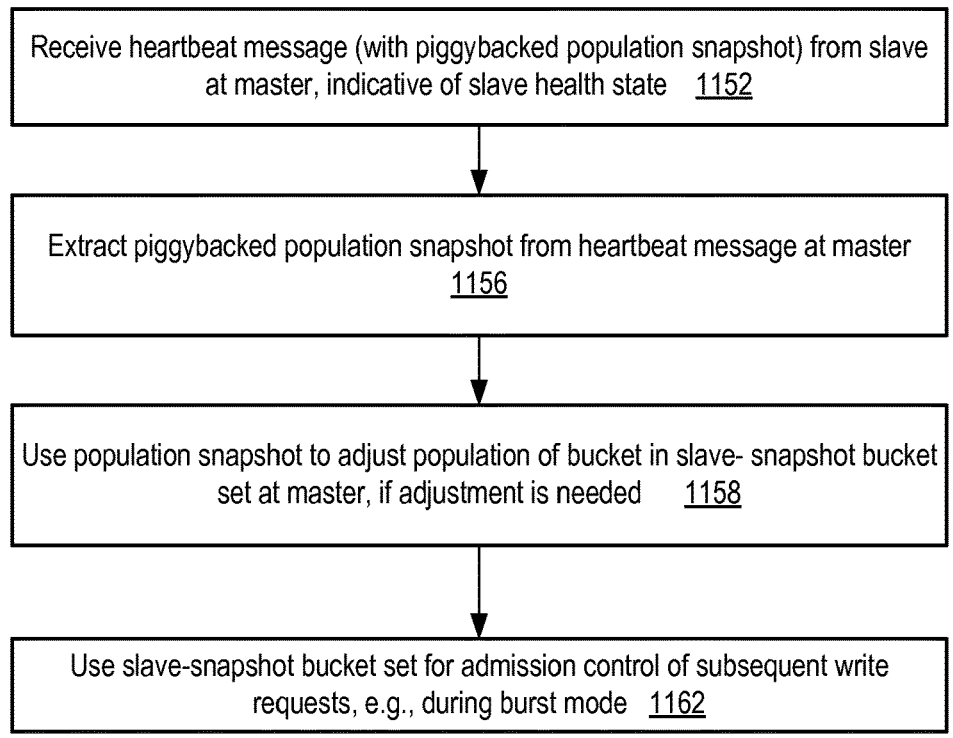

FIGS. 11a and 11b are flow diagrams illustrating aspects of operations that may be performed to obtain slave replica shared-storage bucket population at a master replica, according to at least some embodiments. As shown in element 1102, a write replication request 815 may be transmitted from a master 412 to a slave 416, in accordance with the durability requirements of the data object. A write acknowledgment 820 may be obtained at the master from the slave (element 1106), which may comprise a piggybacked slave population snapshot 650 indicative of the available throughput capacity of a shared storage device 102 in use by the slave. In some embodiments, as noted earlier, only a subset of write acknowledgments may contain piggybacked slave population snapshots. A write acknowledgment with a slave population snapshot may be sent to the master in some embodiments regardless of whether the write succeeded or failed at the slave, so that piggybacked slave state information may be received at the master independently of write replication failures. If the acknowledgment included piggybacked slave population snapshot, the snapshot may be used to adjust or update the population of one or more buckets in the master's slave-snapshot bucket set 155 (element 1108) if needed, and the updated slave-snapshot bucket set may be used to make admission control decisions for subsequent write requests at the master, e.g., during burst mode (element 1112). It is noted that no adjustment may be needed in some cases to the slave-snapshot bucket set—e.g., if a common proxy bucket such as that shown in FIG. 5 is used, and the newly-received snapshot indicates a higher token population than is already known for a different slave's shared-device bucket, no change may be made to the common proxy bucket's population.

As shown in element 1152 of FIG. 11b, in some embodiments a master 412 may be configured to receive heartbeat or "I-am-alive" messages from the slaves, indicative of the slaves' health state. A population snapshot 650 representing available throughput capacity at a shared storage device 102 being used for the slave's data may be piggybacked in the heartbeat message. In addition to verifying the health state of the slave, the master may extract the population snapshot 650 (element 1156) from the heartbeat message. The population of one or more tables of the slave-snapshot bucket set may be adjusted in accordance with the snapshot (element 1158), and the updated slave-snapshot bucket set may be used for making subsequent write admission control decisions (element 1162). As in the case of the embodiment illustrated in FIG. 10a, no adjustment may be needed in some cases to the slave-snapshot bucket set—e.g., if a common proxy bucket such as that shown in FIG. 5 is used, and the newly-received snapshot indicates a higher token population than was last received for a different slave's shared-device bucket. In some implementations, only a subset of heartbeat messages may contain piggybacked slave population snapshots.

It is noted that in various embodiments, some of the operations shown in the flow diagrams of FIGS. 9, 10, 11a and 11b may be omitted or performed in a different order than that shown, or may be performed in parallel rather than serially.

Use Cases

The techniques described above, of conservative token-based admission control for writes, may be useful in a variety of different scenarios. For example, in some database environments clients may have very large (terabytes or petabytes) tables or table sets, and very high I/O rates may be directed at the tables. The durability/redundancy requirements may dictate that several replicas be maintained for each table, and that every write be persisted at several replicas prior to declaring the write successful. In such scenarios, the tables may often be sharded or partitioned across different storage nodes and/or devices, and the set of data that is resident on a given storage device may include portions from replicas of many different partitions of many different tables. In general it may be very hard to anticipate the variation in workloads directed to a given storage device over time. Furthermore, the replicas of a given partition may be distributed across more than one data center, or even in different cities, states or countries. Thus, when making a decision as to whether to accept or reject a given write request, especially during burst modes of operation when the write request rates exceed the provisioned throughput limits being enforced on behalf of clients, the availability of efficiently-transmitted recent throughput capacity information or workload conditions from more than one replica, as described herein, may be very useful. Such admission control mechanisms may help reduce the incidence of replication failures (or unexpectedly long client-perceived latencies resulting from write retries) of accepted write requests, and may thereby increase overall customer satisfaction.

Illustrative Computer System

Figure 12:
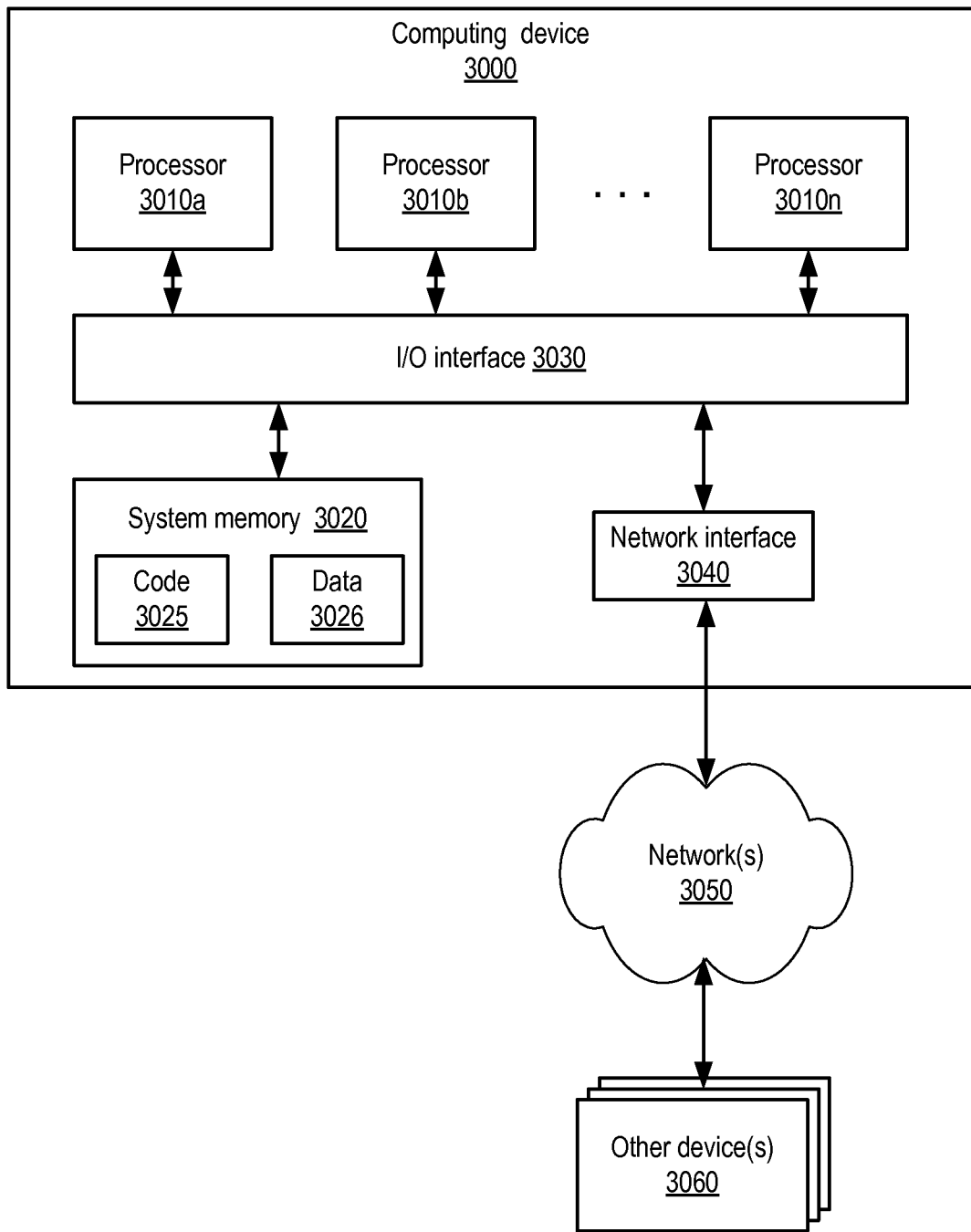
FIG. 12 is a block diagram illustrating an example computing device that may be used in at least some embodiments.

In at least some embodiments, a server that implements a portion or all of one or more of the technologies described herein, including the techniques to implement token-based admission control and/or the storage nodes at which object partitions are replicated, may include a general-purpose computer system that includes or is configured to access one or more computer-accessible media. FIG. 12 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces such as various types of persistent and/or volatile storage devices used to store physical replicas of data object partitions. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 11b, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 11b for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
    storing, corresponding to a logical partition of a data object comprising one or more logical partitions, a master replica of the logical partition at a first storage node and one or more slave replicas of the logical partition at one or more other storage nodes remote from the first storage node, wherein writes to the logical partition are replicated at the first storage node to the master replica and from the first storage node to the one or more slave replicas stored at the one or more other storage nodes remote from the first storage node, in accordance with a replication policy;
    storing, at the storage first node:
        a master bucket set comprising one or more buckets corresponding to the master replica, and
        a slave-snapshot bucket set comprising one or more buckets corresponding to the one or more slave replicas stored at the one or more other storage nodes remote from the first storage node,
        wherein the master bucket set and the slave-snapshot bucket set are both maintained at the first storage node, wherein the slave-snapshot bucket set maintained at the first storage node reflects a view, at the first storage node, of available throughput capacity for the one or more slave replicas at the one or more other storage nodes, and wherein each bucket of the master bucket set and the slave-snapshot bucket set (a) comprises a respective refillable collection of tokens usable to limit throughput of operations directed at the logical partition and (b) has a token consumption policy indicating a number of tokens to be consumed for an allowed operation;
    updating a token population of a particular bucket of the slave-snapshot bucket set based at least in part on a slave bucket update protocol and, in accordance with the slave bucket update protocol, at least in part on an indication of an available throughput capacity received by the first storage node from one of the one or more other storage nodes at which data of a particular slave replica of the one or more slave replicas is stored;
    in response to receiving a write request directed to the logical partition,
        determining, at the first storage node, whether the write request is to be accepted for execution based at least in part on whether a sufficient number of tokens is available in the master bucket set and the slave-snapshot bucket set, in accordance with respective token consumption policies of the buckets of the master bucket set and the slave-snapshot bucket set; and
        in response to determining that the write request is to be accepted for execution, initiating, at the first storage node, one or more data modification operations corresponding to the write request.

2. The method as recited in claim 1, further comprising:
    determining, based at least in part on a token population of a provisioned capacity bucket of the master bucket set, whether the logical partition is in a burst mode of operation; and
    in response to determining that the logical partition is in a burst mode of operation, determining whether the write request is to be accepted for execution based at least in part on whether a sufficient number of tokens is available in (a) a burst handling bucket of the master bucket set and (b) the slave-snapshot bucket set.

3. The method as recited in claim 1, wherein the one or more slave replicas comprise the particular slave replica and a second slave replica, further comprising:
    storing, corresponding to the particular slave replica, a first shared-device bucket whose token population is indicative of available throughput capacity at a shared storage device;
    storing, corresponding to the second slave replica, a second shared-device bucket whose token population is indicative of available throughput capacity at a second shared storage device at which at least a portion of data of the second slave replica is stored, wherein the second shared storage device is configurable to store data corresponding to one or more logical partitions of one or more data objects; and
    wherein implementing said slave bucket update protocol comprises the first storage node obtaining respective point-in-time snapshots of the (a) the token population of the first shared-device bucket and (b) the token population of the second shared-device bucket.

4. The method as recited in claim 3, wherein the slave-snapshot bucket set comprises a common proxy bucket, wherein implementing said slave bucket update protocol comprises:
    determining, based at least in part on the respective point-in-time snapshots, an estimate of the minimum of the token populations among the token populations of the first and second shared-device buckets; and updating the token population of the common proxy bucket based at least in part on the estimate; and wherein, in accordance with a token consumption policy associated with the common proxy bucket, the method further comprises:

accepting the write request for execution based on a determination that the common proxy bucket comprises at least one token and that at least one bucket of the master bucket set comprises at least one token.

5. The method as recited in claim 3, wherein the slave-snapshot bucket set comprises a first snapshot bucket corresponding to the particular slave replica and a second snapshot bucket corresponding to the second slave replica, wherein implementing said slave bucket update protocol comprises:

updating the token population of the first snapshot bucket based on a point-in-time indication of the token population of the first shared-device bucket;

updating the token population of the second snapshot bucket based on a point-in-time indication of the token population of the second shared-device bucket; and wherein the method further comprises:

accepting the write request for execution based on a determination that the first snapshot bucket comprises at least one token, the second snapshot bucket comprises at least one token, and at least one bucket of the master bucket set comprises at least one token.

6. The method as recited in claim 1, further comprising:

transmitting, from the first storage node to one of the one or more other storage nodes for the particular slave replica, a write replication request corresponding to the write request; and receiving, at the first storage node, an acknowledgment of the write replication request, wherein the acknowledgment comprises, in accordance with the slave bucket update protocol, an indication of the available throughput capacity at the shared storage device.

7. A system, comprising:

one or more processors; and a memory coupled to the one or more processors and storing program instructions that when executed by the one or more processors cause the one or more processors to perform:

storing, at a first storage node where a master replica of a logical partition of one or more logical partitions of a data object is stored:

a master bucket set comprising one or more buckets corresponding to the master replica, and a slave-snapshot bucket set comprising one or more buckets corresponding to one or more slave replicas of the logical partition, wherein one or more of the slave replicas are stored at one or more other storage nodes remote from the first storage node, wherein the slave-snapshot bucket set is maintained at the first storage node and reflects a view at the first storage node of available capacity at respective ones of the one or more slave replicas at the one or more other storage nodes, and wherein each bucket of the master bucket set and the slave-snapshot bucket set comprises a respective collection of tokens usable to limit throughput of write operations directed at the logical partition;

updating a token population of a particular bucket of the slave-snapshot bucket set based at least in part on an indication of an available throughput capacity received from one of the one or more other storage nodes at which data of a particular slave replica of the logical partition is stored; and in response to receiving a write request directed to the logical partition, determining, at the first storage node, whether the write request is to be accepted for execution based at least in part on whether a sufficient number of tokens is available in the master bucket set and the slave-snapshot bucket set in accordance with respective token consumption policies of the buckets of the master bucket set and the slave-snapshot bucket set; and in response to determining that the write request is to be accepted for execution, initiating, at the first storage node, one or more data modification operations corresponding to the write request.

8. The system as recited in claim 7, wherein the program instructions when executed by the one or more processors cause the one or more processors to perform:

storing a plurality of slave replicas of the logical partition, including the particular slave replica and a second slave replica;

storing, corresponding to the particular slave replica, a first shared-device bucket whose token population is indicative of available throughput capacity at the shared storage device;

storing, corresponding to the second slave replica, a second shared-device bucket whose token population is indicative of available throughput capacity at a second shared storage device at which at least a portion of data of the second slave replica is stored; and wherein said updating the token population of the particular bucket is based at least in part on the first storage node obtaining (a) a snapshot of the token population of the first shared-device bucket and (b) a snapshot of the token population of the second shared-device bucket.

9. The system as recited in claim 8, wherein the particular bucket comprises a common proxy bucket corresponding to the combination of at least the particular slave replica and the second slave replica, wherein the program instructions when executed by the one or more processors cause the one or more processors to perform:

determining, based at least in part on obtaining a respective snapshot of the first and second shared-device buckets, an estimate of the minimum token population among the token populations of the first and second shared-device buckets;

updating a token population of the common proxy bucket based on the estimate; and accepting the write request for execution based at least in part on an indication that the common proxy bucket comprises at least one token.

10. The system as recited in claim 8, wherein the slave-snapshot bucket set comprises a first snapshot bucket corresponding to the particular slave replica and a second snapshot bucket corresponding to the second slave replica, wherein the program instructions when executed by the one or more processors cause the one or more processors to perform:

updating the token population of the first snapshot bucket based on an indication of the token population of the first shared-device bucket;

updating the token population of the second snapshot bucket based on an indication of the token population of the second shared-device bucket;

accepting the write request for execution based at least in part on a determination that the first snapshot bucket comprises at least one token and the second snapshot bucket comprises at least one token.

11. The system as recited in claim 7, wherein the program instructions when executed by the one or more processors cause the one or more processors to perform:
  transmitting, from the first storage node to the particular slave replica, a replication request corresponding to the write request; and
  receiving, at the first storage node, an acknowledgment of the replication request, wherein the acknowledgment comprises an indication of the available throughput capacity at a shared storage device.

12. The system as recited in claim 7, wherein the program instructions when executed by the one or more processors cause the one or more processors to perform:
  receiving, at the first storage node from the particular slave replica, a heartbeat message indicative of a health state of the particular slave replica, wherein the heartbeat message comprises an indication of the available throughput capacity at a shared storage device.

13. The system as recited in claim 7, wherein the master bucket set comprises a provisioned capacity bucket, wherein the program instructions when executed by the one or more processors cause the one or more processors to perform:
  configuring one or more parameters of the provisioned capacity bucket, including its initial token population and refill rate, based at least in part on an indication of a targeted throughput provided by a client authorized to access the data object; and
  determining that the write request is to be accepted for execution based at least in part on a determination that the provisioned capacity bucket comprises at least one token.

14. The system as recited in claim 13, wherein the master bucket set comprises a burst-handling bucket, wherein the program instructions when executed by the one or more processors cause the one or more processors to perform:
  adding tokens to the burst-handling bucket, wherein the number of tokens added is based at least in part on a determination that a measured rate of operations directed to the logical partition is less than the targeted throughput during a particular time period; and
  in response to (a) receiving a different write request and (b) determining that the provisioned capacity bucket does not contain tokens when the different write request is received, accepting the different write request for execution based at least in part on a determination that the burst-handling bucket comprises at least one token.

15. The system as recited in claim 7, wherein the master bucket set comprises a master shared-device bucket whose token population is based at least in part on available throughput capacity of a shared storage device used to store at least a portion of data of the master replica, wherein the program instructions when executed by the one or more processors cause the one or more processors to perform:
  accepting the write request for execution based at least in part on a determination that the master shared-device bucket comprises at least one token.

16. The system as recited in claim 7, wherein the master bucket set comprises a node capability bucket whose token population is based at least in part on a metric of a performance capability of the first storage node at which data of the master replica is stored, wherein the program instructions when executed by the one or more processors cause the one or more processors to perform:
  accepting the write request for execution based at least in part on a determination that the node capability bucket comprises at least one token.

17. The system as recited in claim 7, wherein the program instructions when executed by the one or more processors cause the one or more processors to perform:
  modifying, in accordance with a configuration request received via a programmatic interface, a property of an admission control policy;
  in response to receiving a different write request directed to the logical partition, determining whether the different write request is to be accepted for execution based at least in part on the property.

18. A non-transitory computer-accessible storage medium storing program instructions that when executed on one or more processors cause the one or more processors to perform:
  storing, at a first storage node, a master replica of a logical partition of a data object, wherein one or more slave replicas including a particular slave replica, wherein the master replica comprises data stored on a first storage device of the first storage node and the particular slave replica comprises data stored on a second storage device of a second storage node remote to the first storage node;
  storing, at the first storage node:
    a master bucket set comprising one or more buckets corresponding to the master replica, and
    a slave-snapshot bucket set comprising one or more buckets corresponding to the one or more slave replicas,
    wherein the master bucket set and the slave-snapshot bucket set are both maintained at the first storage node,
    wherein each bucket of the master bucket set and the slave-snapshot bucket set comprises a respective collection of tokens, and
    wherein the slave-snapshot bucket set maintained at the first storage node reflects a view at the first storage node of available capacity at respective ones of the one or more slave replicas remote to the first storage node based at least in part on updates of available capacity received at the first storage node from respective storage nodes at which the one or more slave replicas are stored;
  receiving a write request directed to at least a portion of the logical partition;
  determining, at the first storage node, whether to accept the write request for execution based at least in part on one or more of (a) available throughput capacity at the master replica, and (b) an indication, obtained from the slave-snapshot bucket set using a token-based protocol, of available throughput capacity at the particular slave replica;
  in response to accepting the write request for execution, initiating, at the first storage node, one or more data modification operations corresponding to the write request.

19. The non-transitory computer-accessible storage medium as recited in claim 18, wherein the program instructions when executed on the one or more processors cause the processors to perform:
  updating a token population of at least a burst handling bucket of the master bucket set to represent available burst throughput capacity at the master replica; and
  wherein said determining whether to accept the write request for execution comprises:

in response to determining that the logical partition is in a burst mode of operation according to a provisioned capacity bucket of the master bucket set, examining the token population of the burst handling bucket of the master bucket set and the token population of the slave-snapshot bucket set.

20. The non-transitory computer-accessible storage medium as recited in claim 19, wherein the program instructions when executed on the one or more processors cause the one or more processors to perform:
in accordance with said accepting the write request for execution, consuming at least one token from the burst handling bucket of the master bucket set and at least one token from the slave-snapshot bucket set.

21. The non-transitory computer-accessible storage medium as recited in claim 20, wherein the at least one token from the burst handling bucket of the master bucket set and the at least one token from the slave-snapshot bucket set are consumed within an atomic operation.

22. The non-transitory computer-accessible storage medium as recited in claim 19, wherein the program instructions when executed on the one or more processors cause the processors to perform:
storing a plurality of slave replicas of the logical partition, including the particular slave replica and a second slave replica;
storing, corresponding to the particular slave replica, a first shared-device bucket whose token population is indicative of available throughput capacity at the second storage device;
storing, corresponding to the second slave replica, a second shared-device bucket whose token population is indicative of available throughput capacity at a third storage device at which at least a portion of data of the second slave replica is stored;
and wherein said updating the token population of the slave-snapshot bucket set is based at least in part on obtaining a respective snapshot of (a) the token population of the first shared-device bucket and (b) the token population of the second shared-device bucket.

23. The non-transitory computer-accessible storage medium as recited in claim 22, wherein the slave-snapshot bucket set comprises a common proxy bucket, wherein the program instructions when executed by the one or more processors cause the one or more processors to perform:
determining an estimate of the minimum token population among the token populations of the first and second shared-device buckets;
updating the population of the common proxy bucket based on the estimate; and
accepting the write request for execution based at least in part on determining that the common proxy bucket comprises at least one token.

24. The non-transitory computer-accessible storage medium as recited in claim 18, wherein the program instructions when executed by the one or more processors cause the one or more processors to perform:
transmitting, from the first storage node to the second storage node, a replication request corresponding to the write request; and
receiving, at the first storage node, an acknowledgment of the replication request, wherein the acknowledgment comprises the indication of the available throughput capacity at the particular slave replica.

25. The non-transitory computer-accessible storage medium as recited in claim 18, wherein the program instructions when executed by the one or more processors cause the one or more processors to perform:
receiving, at the first storage node from the second storage node for the particular slave replica, a heartbeat message indicative of a health state of the particular slave replica, wherein the heartbeat message comprises the indication of the available throughput capacity at the second storage device.

26. The non-transitory computer-accessible storage medium as recited in claim 18, wherein the data object comprises contents of a database table.

* * * * *